(12) United States Patent
Jones et al.

(10) Patent No.: US 7,099,510 B2
(45) Date of Patent: Aug. 29, 2006

(54) METHOD AND SYSTEM FOR OBJECT DETECTION IN DIGITAL IMAGES

(75) Inventors: Michael J. Jones, Cambridge, MA (US); Paul Viola, Brookline, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 09/992,795

(22) Filed: Nov. 12, 2001

(65) Prior Publication Data

US 2002/0102024 A1    Aug. 1, 2002

Related U.S. Application Data

(60) Provisional application No. 60/253,871, filed on Nov. 29, 2000.

(51) Int. Cl.
*G06K 9/62* (2006.01)

(52) U.S. Cl. .............. 382/225; 348/142; 348/152; 382/118; 382/159; 382/203

(58) Field of Classification Search ............ 382/115, 382/116, 118, 157, 159, 195, 224, 279, 203, 382/228; 348/142, 152
See application file for complete search history.

(56) References Cited

U.S. PATENT DOCUMENTS

| | | | | |
|---|---|---|---|---|
| 4,965,725 A | * | 10/1990 | Rutenberg | 382/224 |
| 5,642,431 A | * | 6/1997 | Poggio et al. | 382/118 |
| 5,850,470 A | * | 12/1998 | Kung et al. | 382/157 |
| 6,014,461 A | * | 1/2000 | Hennessey et al. | 382/195 |
| 6,184,926 B1 | * | 2/2001 | Khosravi et al. | 348/239 |
| 6,421,463 B1 | * | 7/2002 | Poggio et al. | 382/224 |
| 6,647,139 B1 | * | 11/2003 | Kunii et al. | 382/159 |
| 6,940,545 B1 | * | 9/2005 | Ray et al. | 348/222.1 |
| 6,944,342 B1 | * | 9/2005 | Stahl et al. | 382/224 |

OTHER PUBLICATIONS

Papageorgiou, C.P., et al., "A General Framework for Object Detection," Proceedings of International Conference on Computer Vision, Bombay, India (Jan. 1998) (8 pages).

Freund, Y., et al., "Experiments with a New Boosting Algorithm," Machine Learning: Proceedings of the Thirteenth International Conference (1996) (9 pages).

Schneiderman, H., et al., "A Statistical Method for 3D Object Detection Applied to Faces and Cars," IEEE, Conference on Computer Vision and Pattern Recognition, Hilton Head, South Carolina (Jun. 2000) (6 pages).

(Continued)

*Primary Examiner*—Sanjiv Shah
*Assistant Examiner*—Gregory Desire
(74) *Attorney, Agent, or Firm*—Richard P. Lange

(57) ABSTRACT

An object detection system for detecting instances of an object in a digital image includes an image integrator and an object detector, which includes a classifier (classification function) and image scanner. The image integrator receives an input image and calculates an integral image representation of the input image. The image scanner scans the image in same sized subwindows. The object detector uses a cascade of homogenous classification functions or classifiers to classify the subwindows as to whether each subwindow is likely to contain an instance of the object. Each classifier evaluates one or more features of the object to determine the presence of such features in a subwindow that would indicate the likelihood of an instance of the object in the subwindow.

37 Claims, 8 Drawing Sheets

OTHER PUBLICATIONS

Romdhani, S., et al., "Computationally Efficient Face Detection," Proceedings Eighth IEEE International Conference on Computer Vision, Vancouver, BC 11: 695-700 (Jul. 2001).

Rowley, H.A., et al., "Neural Network-Based Face Detection," IEEE Transactions on Pattern Analysis and Machine Intelligence, 20(1): 23-38 (1998).

Sung, K.K., "Example-Based Learning for View-Based Human Face Detection," IEEE Transactions on Pattern Analysis and Machine Intelligence, 20(1): 39-50 (1998).

Amit, Y., et al., "A Computational Model for Visual Selection," 1-35, Department of Statistics, University of Chicago (Feb. 1998).

\* cited by examiner

METHOD AND SYSTEM FOR OBJECT DETECTION IN DIGITAL IMAGES

RELATED APPLICATION

This application claims the benefit of U.S. Provisional Application No. 60/253,871, filed on Nov. 29, 2000. The entire teachings of the above application are incorporated herein by reference.

BACKGROUND OF THE INVENTION

Computers perform processing of graphic images in a digital format (e.g., photographs, still images from videos, and so on). Often, the goal of this processing is to locate objects of interest (e.g., faces) in an image. Given enough processing time to process an image (typically using a digital processor), a computer is capable of detecting most or all well defined instances of an object in an image. One common goal for object detection is the detection of human faces, although computers can use object detection to detect various types of objects in an image. This process of detecting objects (e.g., faces) is useful for user interfaces, the scanning of image databases, in teleconferencing, electronic processing of photographs, and other suitable areas. The appearance of objects varies greatly across individuals, images, camera locations, and illuminations.

There are a number of existing methods for detecting objects (e.g., faces) in images. Most existing, prior art approaches for detecting objects (e.g., faces) in an image share a number of properties. First, for example, the conventional object detector uses a learning algorithm based on a training data set that contains many examples of face and non-face image patches (the smallest possible region that might contain a face—usually, a patch or subwindow 16×16 or 20×20 pixels). One such learning algorithm is based on conventional neural network approaches. In a learning phase based on a training data set, the learning algorithm constructs a classification function which can label patches as either face or non-face.

Finally, in a conventional approach, an object detector uses a scanning process to enumerate all possible patches (subwindows) within a given image. Each image contains many independent patches. Every unique location and scale in the image can yield an independent patch. In practice, a 320 pixel×240 pixel image can produce approximately 50,000 patches (the number of patches scales quadratically with the scale of the image). The classification function is run against all such patches to detect the possible presence of an instance of the object in the patch. When an object detector, through one or more classification functions, detects an object (e.g, a face), the object detector records the location and scale of the patch for later output (e.g., reporting to an end-user of the computer).

To detect an object in a patch, many conventional, prior-art approaches work directly with intensity values (grayscale degree of lightness or darkness) of the pixels of the patches. In one prior art approach, the object detection software uses wavelet functions, such as Haar Basis functions that evaluate boxes in a patch, to detect an object in a patch.

SUMMARY OF THE INVENTION

In general, known prior art approaches may have a high rate of accurate detection of objects in an image, but may perform the object detection process in a relatively slow manner compared to the present invention. The classification may be based on gaussian discriminators, or on neural networks, which generally provide an accurate, but slow result. For example, to identify instances of an object in an image, prior art approaches typically take one to many seconds to process the image on a desktop personal computer (i.e., with an Intel 700 MHz Pentium III processor), whereas a comparable computer configured according to the present invention takes substantially less than one second for the same image (approximately $1/15$ of a second).

Almost all previous approaches to object detection perform a large amount of work (large number of computations by a digital processor) in the scanning process alone. In order to support scanning at multiple scales, the input image must be scaled down to multiple resolutions. In prior art approaches, this scaling is accomplished by constructing an image pyramid, that is, multiple copies of the original input image at different scales (e.g., each image is typically 80% of the size of the previous image in the pyramid). This conventional process alone often requires 50–100 operations per pixel. One reason for this number of operations is that the computer must perform interpolation calculations between pixels as part of the scaling process. That is, if an initial 100 by 100 pixel image is scaled to a 80 by 80 pixel reduced image, then some pixels in the initial image must be eliminated, and interpolated values calculated for some pixels in the reduced image to reflect the elimination of pixels.

An object detector of the present invention engages in much less initial image processing compared to prior art approaches. The present invention creates and uses an image representation called an integral image, in contrast to typical prior art approaches that use an image pyramid. In a preferred embodiment, the present invention computes the integral image in less than about 10 operations per pixel. Nevertheless, the object detector of the present invention detects objects (e.g., faces) at any scale and location.

Prior art approaches evaluate pixels to identify an instance of an object in a subwindow, or rely on wavelets to identify a subwindow that is likely to contain an instance of an object. The present invention uses a feature representation, which detects objects (e.g., faces) by looking for the appearance of features, which have basic geometric shapes (e.g., based on rectangular boxes). These simple features, combined with the integral image, allow for a computationally efficient approach to identifying whether a given area in a subwindow (e.g., given boxes) has a feature of interest (that may identify an instance of the object, usually along with other features). This approach of the invention is more powerful and more efficient than looking at the pixels of the image itself as is done in many prior art approaches.

The present invention also provides a faster classification function than prior art classification functions. Using a cascaded approach, the present invention quickly determines if a face could potentially appear at a given scale and location. In some cases this can be done in 20 or less operations for a subwindow (i.e., patch) of the integral image. The present invention chains similar or homogenous types of classification functions together in a cascade of classification functions. This approach of the invention allows the object detector to discard quickly subwindows that do not show enough features of the object and to continue to process through the cascade only those subwindows that have enough features that indicate the likelihood of an instance of the object in the subwindow. Each classification function is a similar type of function. However, in sequence farther in position toward the end of the cascade, each classification function is increasingly accurate in detecting an instance of an object in a subwindow (e.g., relies on more features).

The present invention can be used in real-time applications in which the appearance of an object can be used to drive a user interface. For example, an object detector for faces (i.e., face detector) that is designed in accordance with the present invention functions in a kiosk like those used in bank ATM's (automatic teller machines) or airport ticketing machines to identify faces in a real-time application. Knowledge of the location and scale of a face can be used in teleconferencing applications as well. For example, the camera can be made to zoom in on the faces of the participants. This ability to zoom enables increased quality and reduced bandwidth. A face detector based on the present invention can also play a central role in security camera applications. Such a face detector may be used to summarize many hours of airport surveillance tape into a single web page that shows a picture of each person that passed through a security checkpoint. Generally, the face detector of the present invention be used as the front end processor for a face recognition system.

The face detector can also be used in off-line applications such as image database browsing. Automatically determining which images contain faces yields important meta-information about each image. If users are searching for an image of a specific person, such meta-information can be used to insure that face recognition system based on the present invention returns only images containing people. Detection of faces is also an important first step for the recognition of individuals.

Thus, the present invention provides computer apparatus and computer-implemented methods for detecting instances of objects in an image. In a preferred embodiment of the present invention, an object detection system includes an image scanner and an object detector. The image scanner places a working window at different positions in an input image such that the input image is divided into same dimension subwindows. The object detector provides a cascade of homogenous classification functions (classifiers). Each of the homogenous classification functions in sequence in the cascade respectively has increasing accuracy in identifying the certain objects. A homogenous classification function consists of a number of features. A feature is, for example, based on a set of eyes in a human face. A classifier (homogeneous classification function) detects that the presence of such a feature is likely in a subwindow by using two horizontal rectangular boxes, one overlaying the darker region indicated by the eyes, and a second horizontal rectangular box overlaying a lighter region indicated by the cheeks of the face. For each subwindow, the object detector employs the cascade of homogenous classification functions to detect instances of the certain objects in the image.

In one aspect of the present invention, the image scanner scales the dimensions of the subwindows by changing a size of the working window. The object detector scales the homogenous classification functions respectively for each different size of the working window. For each different size of the working window, (i) the image scanner repeats placing of the scaled working window at different positions in the input image to divide the input image into same dimension subwindows equal in size to the scaled working window, and (ii) the object detector repeats employing the cascade of scaled homogenous classification functions to detect the instances of the certain objects.

In another aspect, the object detection system includes an image integrator, which computes an integral image representation of the input image. The object detector uses the integral image representation in computing the homogenous classification functions.

In a further aspect the certain objects are human faces.

The object detection system includes, in a further aspect, a training server. The training server trains the homogenous classification functions in a learning phase based on a training data set and thereby identifies optimal such functions.

In another aspect, the training server constructs the cascade based on the optimal homogenous classification functions such that the object detector performs the employing of the cascade at an average processing rate of less than about 200 arithmetic operations for each subwindow.

In a further aspect, the processing rate is independent of the dimensions of the subwindows.

The object detector, in another aspect, provides to a computer output device an output image that identifies the detected instances of the certain objects based on the employing of the cascade.

In another aspect, each homogenous classification function (classifier) is based on one or more of the features and corresponding threshold functions. Each threshold function has a predefined feature threshold for the given feature indicating a presence of the given feature in the subwindow (or lack of such presence). Each homogeneous classification function is based on a summation function that sums all of the threshold functions for all of the features evaluated by the homogenous classification function. Before summation, each threshold function is weighted by a predefined weight for that threshold function. The summation function includes a global threshold that determines whether or not a sum of the summation function indicates a detection of one of the instances of the certain object in the given subwindow.

In another aspect, the present invention provides a computer apparatus and methods for detecting objects in an input image at a relatively fast rate of processing. In one aspect, an object detection system includes an image scanner and an object detector. The image scanner divides an input image into subwindows. Each subwindow has a sufficient size to allow processing of features associated with the certain objects. The object detector processes the subwindows at an average processing rate of less than about 200 arithmetic operations for each subwindow by (a) evaluating the features in each subwindow, and (b) classifying each subwindow to detect an instance of the certain objects based on the evaluation of the features.

In another aspect, the processing rate is independent of dimensions of the subwindows.

The object detection system, in a further aspect, includes an image integrator. The image integrator computes an integral image representation of the input image. The object detector uses the integral image representation to compute homogenous classification functions for use in the processing of the subwindows.

In a further aspect, the object detector, for each subwindow, employs a cascade of optimal homogenous classification functions (classifiers). Each optimal homogenous classification function in sequence in the cascade respectively has increasing accuracy in identifying the features associated with the certain objects. At each optimal homogenous classification function in the cascade, (a) if a subject subwindow has the detected instance of the certain object, the object detector continues to pass the subject subwindow through the cascade for further processing, and (b) if the subject subwindow does not have the detected instance of the certain object, the object detector ceases to pass the subject subwindow through the cascade.

In another aspect, the certain objects are human faces.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
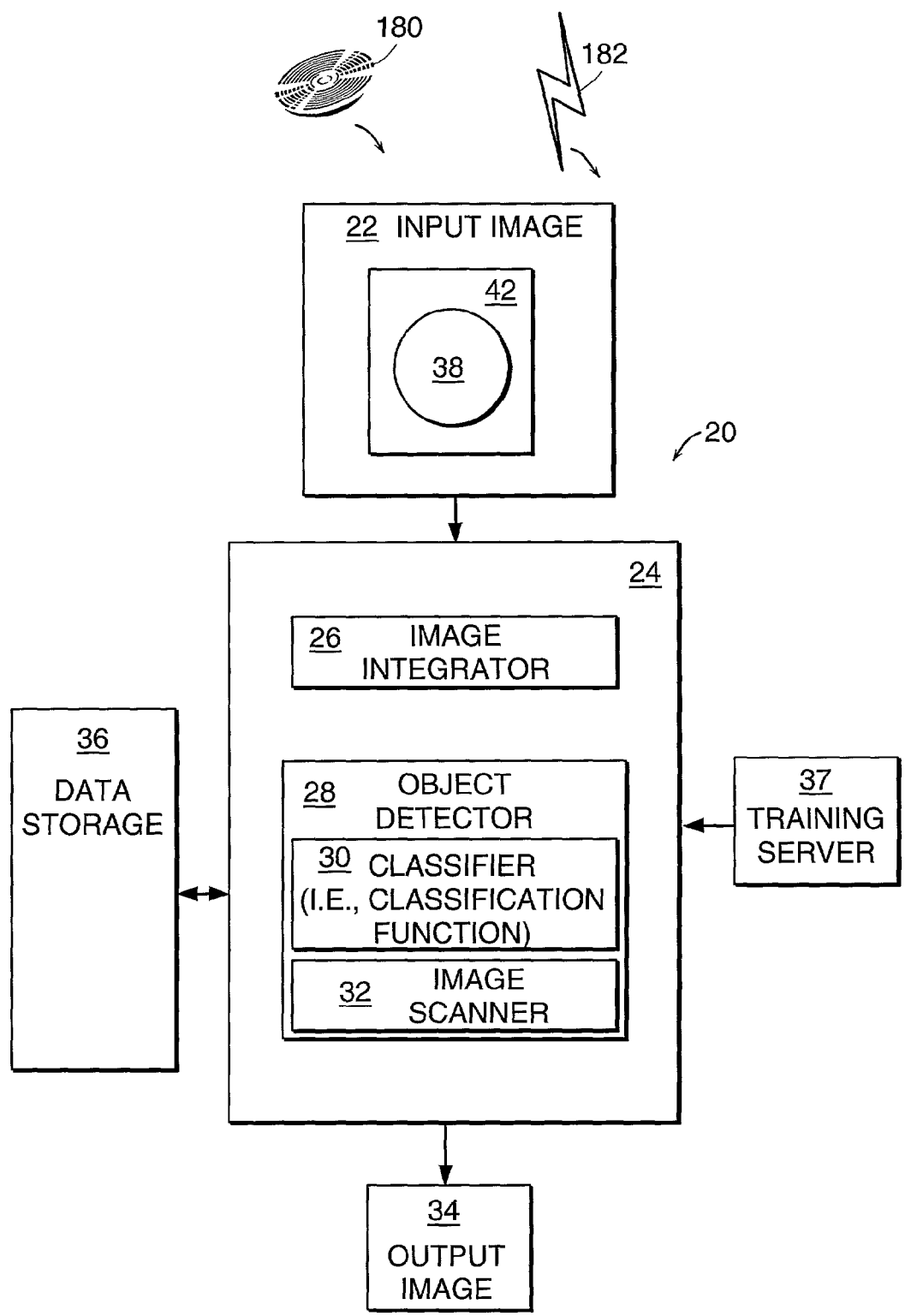
FIG. 1 is a block diagram of an object detection system according to the present invention.

FIG. 1 is a block diagram of an object detection system 20 according to the present invention. The object detection system 20 includes a digital processor 24 and data storage 36 and is used to detect one or more instances of certain objects (i.e., predefined category of objects). The digital processor 24 hosts and executes an image integrator 26 and an object detector 28 in working memory. The input image 22 is a digital image composed of bits (i.e., pixels) based on a photographic image, an image from a video, a computer created image, or other digital image. The output image 34 is a digital image composed of bits based on the input image 22 with highlighting that indicates the detected instances 38 of objects.

The input image 22 includes an object representation (i.e., instance) 38 of an object displayed in a subwindow 42 of image 22. The object representation 38 is a recognizable instance of the object based on a realistic (e.g., photographic), drawn, painted, caricatured, cartoon, or other recognizable representation of the object. The contents of subwindow 42 is a part of the input image 22 based on a geometric shape (e.g., rectangle, square, or other shape). The object is a certain object based on a predefined type or category of objects, such as faces, dogs, cars, trees, or other recognizable objects with a distinct appearance that distinguishes them from other objects.

The image integrator 26 is a software program, routine, object, module, or firmware or hardware entity that creates an integral image representation 44 (see FIG. 2) of the input image 22. The object detector 28 is a software program, routine, object, module, or firmware or hardware entity that detects instances of objects in an image 22 or part of an image 22 (e.g., patches or subwindows 42). The object detector 28 includes a classifier 30 (e.g., classification function based on one or more features of an object) that evaluates an image 22 or part of an image 22 to determine if an instance 38 of the object is detected or not. In a preferred embodiment, the object detector 28 uses a cascade of serially linked classifiers 30 (see FIG. 7). The object detector 28 includes an image scanner 32 that processes the input image 22 to divide the image 22 into smaller working pieces or subwindows 42.

The data storage 36 is a data storage device (e.g., one or more disk drives) associated with the object detection system 20 that stores data as needed for the digital processor 24, such as the input image 22, working copies of the input image 22 as it is processed, and the output image 34.

The training server 37 is a digital computer, such as a network server, that is used in the learning phase of the present invention to train the classifiers 30 (classification functions) based on a training data set that includes many digital images with predetermined or known instances of the object as well as negative example images showing what the object is not. The training server 37 functions to train the classifiers 30 in a preliminary or one-time learning phase. That is, the object detector 28 then uses the classifiers 30 to detect object representations 38 in images 22 without requiring further input from the training server 37.

In one embodiment, a computer program product 180, including a computer readable or usable medium (e.g., one or more CDROM's, diskettes, tapes, etc.), provides software instructions for the image integrator 26 and/or object detector 28. The computer program product 180 may be installed by any suitable software installation procedure, as is well known in the art. In another embodiment, the software instructions may also be downloaded over an appropriate connection. A computer program propagated signal product 182 embodied on a propagated signal on a propagation medium (e.g., a radio wave, an infrared wave, a laser wave, a sound wave, or an electrical wave propagated over the Internet or other network) provides software instructions for the image integrator 26 and/or object detector 28. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 180 is a propagation medium that the computer may receive and read, such as by receiving the propagation medium and identifying a propagated signal embodied in the propagation medium, as described above for the computer program propagated signal product 182.

Figure 2:
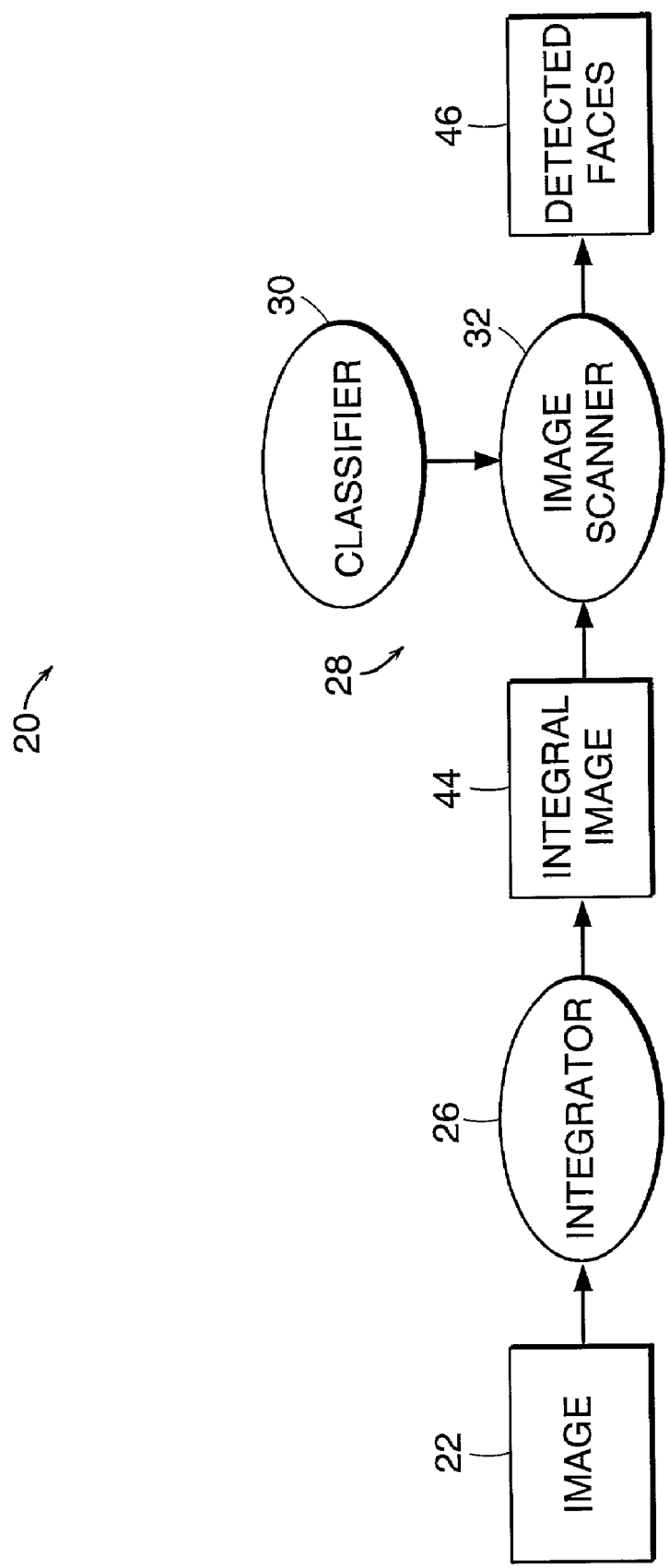
FIG. 2 is a schematic diagram of the flow of control for the object detector of FIG. 1.

FIG. 2 is a schematic diagram of the flow of control for the object detector 28 of FIG. 1. The object detection system 20 receives the input image 22, which may be received over a network, from a photographic or video camera, from data storage 36, or from another suitable source of digital images. The image integrator 26 computes the integral image 44, which is a representation of the input image 22 as described in more detail later in FIG. 5. The image scanner 32 then scans the integral image 44 to divide the integral image 44 into subwindows 42 and uses the classification function or classifier 30 to classify each subwindow 42 in the integral image 44 as having detected faces 46 or not. The object detector 28 then outputs an output image 34 with the object representations 38 highlighted (e.g., with bounding boxes surrounding each detected face 46).

Figure 3:
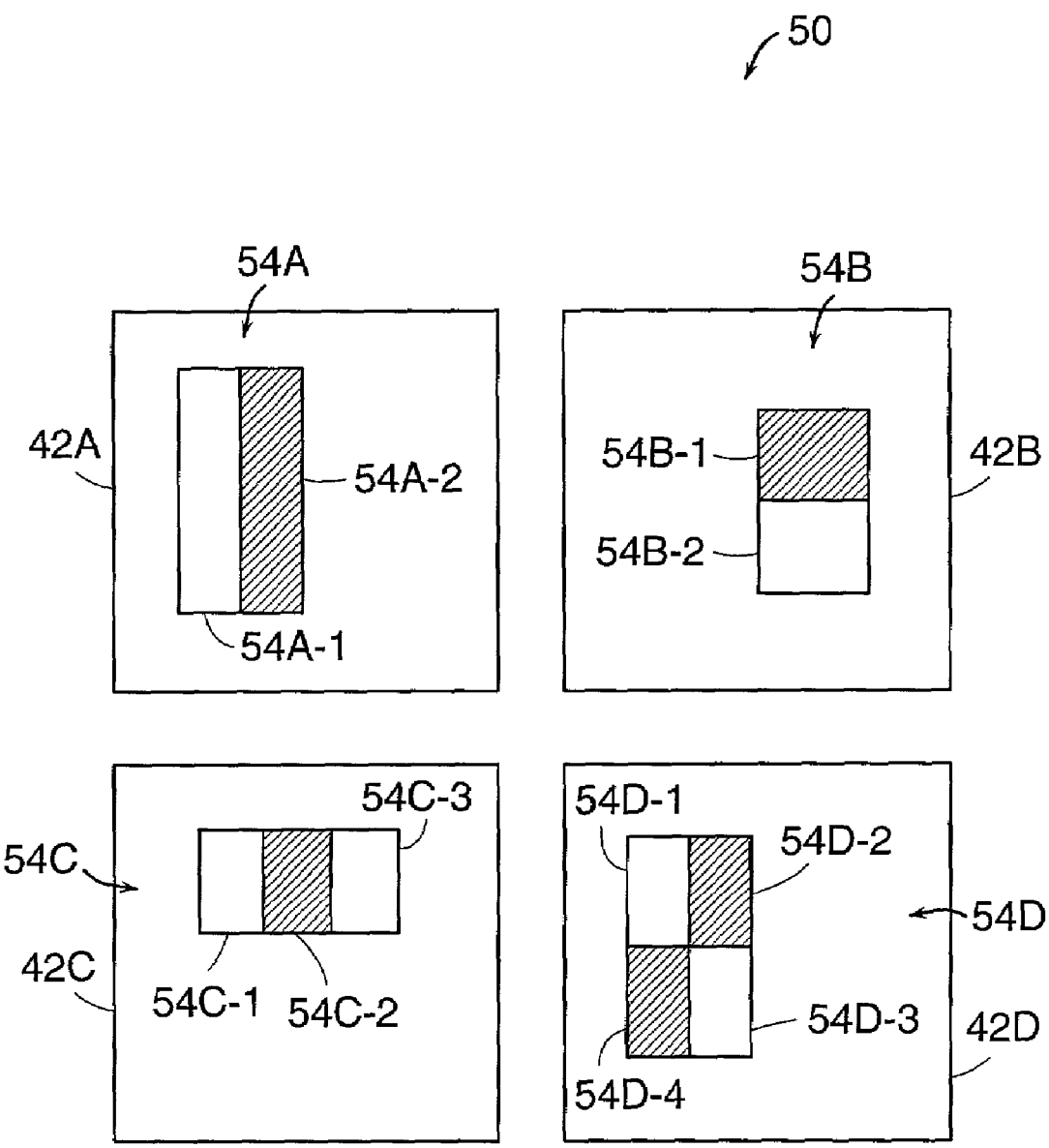
FIG. 3 is a pictorial illustration of rectangular features within windows according to the present invention.

FIG. 3 is a pictorial illustration of rectangular features 54 (e.g., 54A, 54B, 54C, 54D) within windows (or subwindows) 42 (e.g., 42A, 42B, 42C, 42D) of an image 22 according to the present invention. FIG. 3 illustrates four windows 42A, 42B, 42C, and 42D, that represent subwindows in one or more images 22. Within the windows 42A, 42B, 42C, and 42D are respective rectangular features 54A, 54B, 54C, and 54D. Rectangular feature 54A is composed of two vertical rectangular boxes, 54A-1 and 54A-2. The box 54A-2 is shaded to indicate that, when feature 54A has a "true" threshold value, box 54A-2 overlays a darker region of the image 22 than the region overlaid by box 54A-1. See the discussion for FIG. 4, for more details on the threshold function for a feature 54. Rectangular feature 54B is composed of two horizontal boxes 54B-1 and 54B-2 in rectangular feature 54B. The uppermost box 54B-1 is shaded to indicate that it is a darker box when feature 54B has a "true" threshold value. Rectangular feature 54C is composed of three boxes, 54C-1, 54C-2, and 54C-3. In rectangular box 54C, the middle box 54C-2 is shaded to indicate that it overlays a darker region of an object representation 38 when feature 54C has a "true" threshold value. Rectangular feature 54D is composed of four rectangular boxes, 54D-1, 54D-2, 54D-3, and 54D-4. In rectangular feature 54D, the boxes 54D-2 and 54D-4 are both shaded to indicate regions that are darker than the other boxes, 54D-1 and 54D-3, in the rectangular feature 54D when the feature 54D has a "true" threshold value.

The evaluation function f for each rectangular feature 54A, 54B, 54C, 54D determines the value of the feature 54A, 54B, 54C, and 54D by subtracting the sum of the pixels (intensity values) which lie within the white rectangles from the sum of the pixels in the darker rectangles. For example, the evaluation function f for feature 54A determines the value by subtracting the sum of the pixels which lie within the white rectangle 54A-1 from the sum of pixels in the darker rectangle 54A-2. Another possible feature has the sum for 54A-2 subtracted from the sum for 54A-1.

The evaluation function f for the three rectangle feature 54C computes the sum within two outside rectangles 54C-1 and 54C-3, and subtracts from the sum of the pixels in the center rectangle, 54C-2 to obtain the value for the feature 54C.

The four features 54 shown in FIG. 3 are examples of the features 54 used to build a classifier. The full set of features 54 includes variations of these examples in terms of their position, size and orientation (vertical or horizontal).

In general, the classification function or classifier 30 (FIG. 1) uses one or more rectangular features 54 to detect simple features in an object. For example, the classifier 30 uses the four rectangle feature 54D to detect a diagonal pattern or line within an object representation 38. The classifier 30 uses the three rectangle feature 54C to detect for example, a mouth in a face, because the darkened region in 54C-2, as shown in FIG. 3, would overlay or represent the mouth and the lighter rectangles, 54C-1 and 54C-3, would overlay or represent the cheeks of the face.

This rectangular feature approach of the present invention uses rectangular features 54, rather than evaluating the pixels of the image 22 directly. The feature-based system of the present invention typically operates more quickly than a traditional pixel-based system because the rectangle features 54 can be computed very quickly (without looking at every pixel in the feature 54) using the integral image representation 44.

Figure 4:
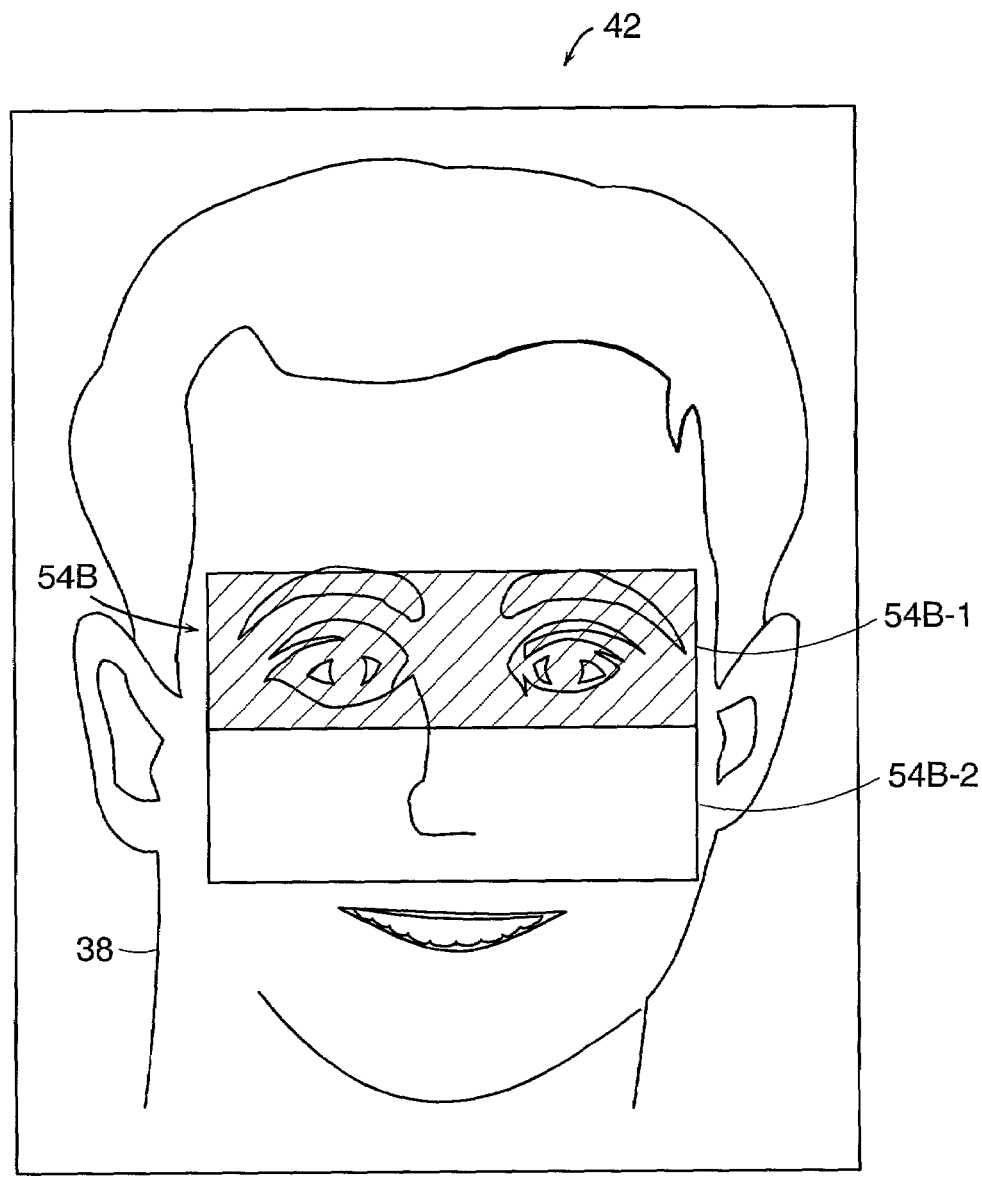
FIG. 4 is a pictorial illustration of a rectangular feature of FIG. 3 overlaid on a representation of a face, such as found in input images.

FIG. 4 is a pictorial illustration of a rectangular feature 54B overlaid on a representation 38 of a face image according to the present invention. This rectangular feature 54B measures the difference in intensity between the region of the eyes (darker region) and a region across the upper cheeks (lighter region). This feature 54B capitalizes on the observation that the eye region is often darker than the cheeks. Thus, when the feature 54B is overlaid on the facial representation 38, as shown in FIG. 4, the sum of the pixels (intensity or gray scale values) in the upper horizontal box 54B-1 indicate a darker region (the eyes) than the sum of the pixels in the lower horizontal box 54B-2, which indicates a lighter region (the cheeks). In a preferred embodiment, the evaluation function f for feature 54B subtracts the sum of the pixels in the lower horizontal box 54B-2 from the sum of the pixels in the upper horizontal box 54B-1. A threshold function h for feature 54B then compares this difference to a threshold to determine a true value (indicating a high likelihood that the feature 54B is overlaying a set of eyes in the subwindow 42) or a false value (indicating a low likelihood that the feature 54B is overlaying a set of eyes in the subwindow 42). In other words, in a preferred embodiment, if the difference is below the threshold value, then the threshold function h for feature 54B has a false value (e.g., 0), and if the difference is above the threshold value, then the threshold function h for feature 54B has a true value (e.g., plus 1). In another embodiment, this threshold relationship is reversed. If the difference is below the threshold value, then the threshold function h for feature 54B has a true value, and if the difference is above the threshold value, then the threshold function h has a false value.

In general, the form of the classifier 30 (classification function) is a collection of features 54, a set of weights and a final threshold theta (global threshold for the classifier 30 as a whole). Each feature 54 is given a unique weight and the weighted sum of features 54 is computed. If this weighted sum is above the global threshold, the classifier 30 returns TRUE. The true value indicates that the classifier 30 has found that the subject window 42 has a high likelihood of having an object representation 38 within the window 42.

In mathematical terms, in a preferred embodiment, the threshold function h (also termed a "weak classifier") is expressed as the following:

$$h_j = \begin{cases} 1, \text{ if } p_j f_j(x) > p_j T_j \\ 0, \text{ otherwise} \end{cases} \quad (1)$$

where x is a 24 pixel×24 pixel patch (subwindow) 42 of the input image 22. The variable x contains the values in the patch 42 an array of numbers that is stored in a linear manner so that x is a vector [0 . . . 576] of one byte integers (each integer having a value of 0–255 representing a gray scale intensity value for one pixel in the image 22).

In general, without reference to the subscripts (which will be discussed next) the function f is the evaluation function for a rectangular feature 54, as discussed for FIG. 3. In general, the value T is the threshold, and the evaluation function f must evaluate to a value larger than T for the threshold function h to have a value of 1. A polarity value p (having a value of +1 or −1) indicates the direction of the inequality sign in equation (1). Thus, if the polarity value is positive (+1), then the value of f must evaluate to a value larger than the threshold T for the threshold function h to have a value of 1, and if the polarity value is negative (−1), then the value of f must evaluate to a value less than the threshold T for the threshold function h to have a value of 1.

The subscript j is applicable when the classifier 30 (classification function) includes more than one feature 54, and thus more than one evaluation functions $f_j$ (one for each feature), and more than one threshold function $h_j$, (one for each feature). Each feature has its own threshold value $T_j$.

If the classifier 30 (classification function) has more than one feature 54, then the classifier 30 is based on the summation of the threshold functions h, as follows:

$$\sum_{j=1}^{N} w_j h_j(x) > \theta \quad (2)$$

The function h is the threshold function as defined in equation (1). The weight w is the weight applied to each threshold function h that represents the weight or importance given to the feature 54 for that threshold function. In other words, the weight w measures how important that feature 54 is in identifying an instance 38 of the object in the working patch or subwindow 42. The threshold $\theta$ is a global threshold for the summation as a whole. In other words, if the sum indicated in equation (2) is greater than this threshold, then the classifier 30 has a value of TRUE, indicating that the subwindow 42 is likely to contain an instance of the object. If the sum indicated in equation (2) is less than this global threshold, then the classifier 30 has a value of FALSE, indicating that the subwindow 42 is not likely to contain an instance of the object. The weight w and global threshold $\theta$ are determined in a learning phase based on a training data set, to be discussed in more detail later. The value N is the number of features 54 that are evaluated in the classifier 30. If N is large, then the classifier 30 is more accurate, and if N is small, then the classifier 30 is faster.

Figure 5:
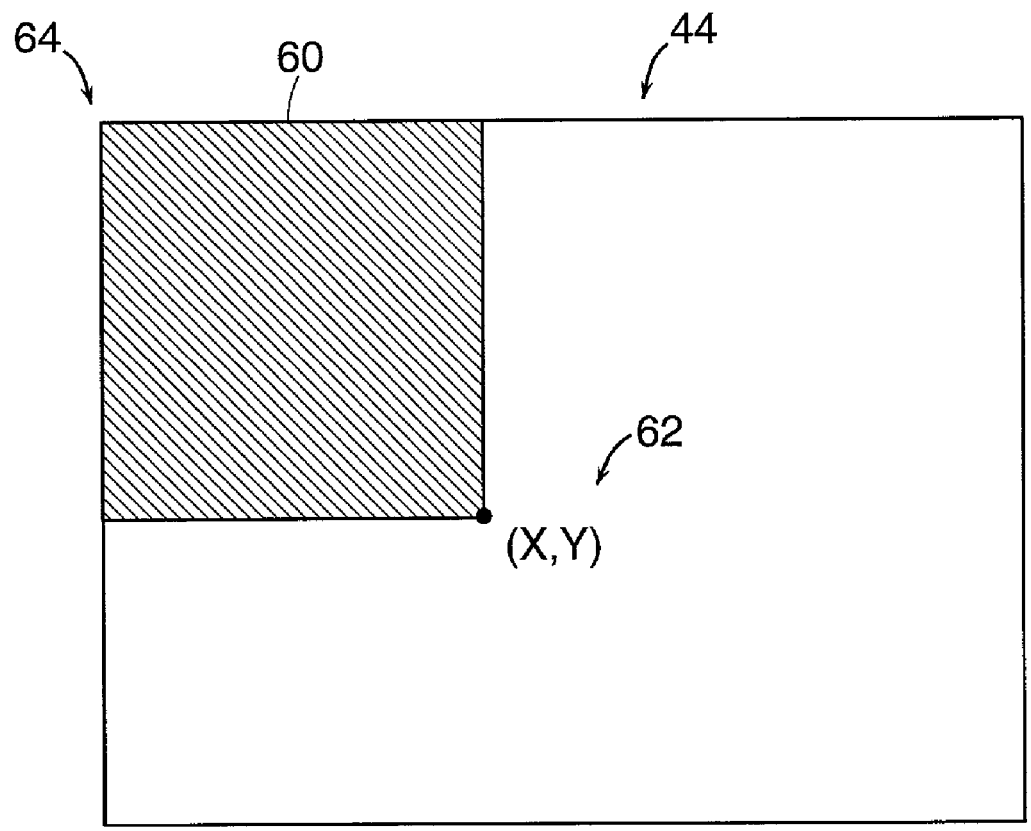
FIG. 5 is a diagrammatic illustration of an integral image representation according to the present invention.

FIG. 5 is a diagrammatic illustration of an integral image 44 according to the present invention. The (x,y) value of the integral image 44 at point 62 in a preferred embodiment, is the sum of the pixels (intensity values) in an integral area 60, that is, the sum of all the pixels above and to the left of the point 62. The location of point 62 in FIG. 5 is shown as an example only, and point 62 may represent any point in the integral image 44 (except for point 64, to be discussed next). Each pixel has an intensity value, which is a grayscale value based on a scale of 0 to 255. To create the integral image 44, first the integrator 26 retains the pixel value (e.g., intensity value) of the point 64 at the upper left hand corner of the integral image 44. Then the integrator 26 moves to each point 62 in the integral image 44 and calculates the integral value for that point 62 by summing the pixel values for all of the pixels above and to the left of the subject point, as described above. In a preferred embodiment, the integrator 26 performs these calculations in one pass over all of the points 62 in the input image 22 to create the integral image 44. Moving left to right, then top to bottom, the integrator 26 keeps a running sum for each row.

Figure 6:
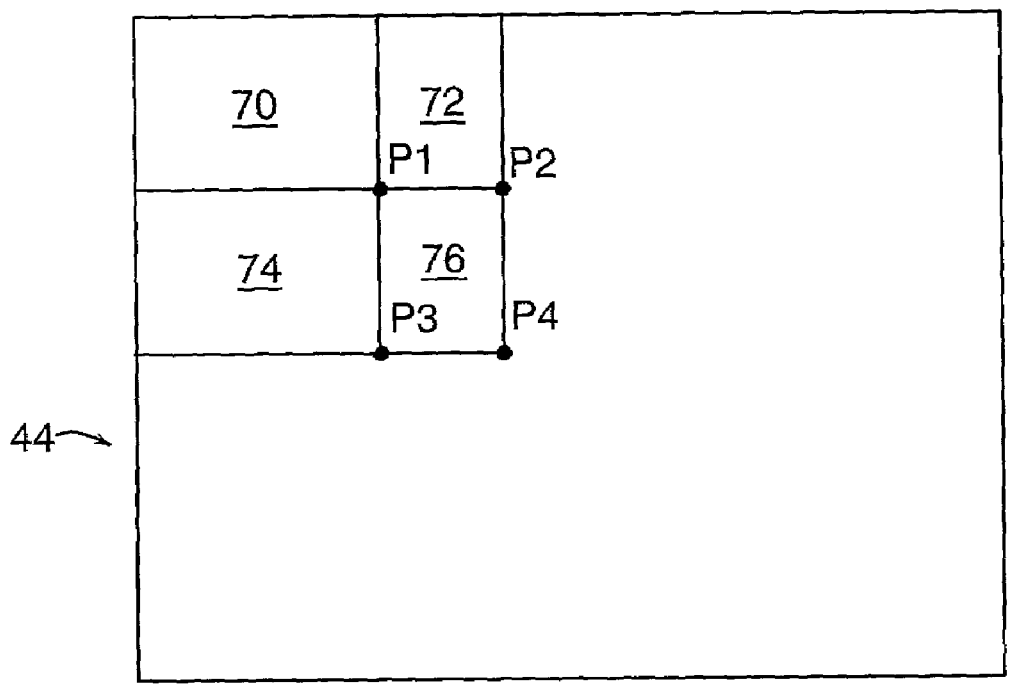
FIG. 6 is a diagrammatic illustration of a box car sum according to the present invention.

FIG. 6 is a diagrammatic illustration of a rectangular (also termed box car) sum according to the present invention. FIG. 6 illustrates rectangular regions or boxes 70, 72, 74, and 76 and points p1, p2, p3, and p4 in the integral image 44. Each point, p1, p2, p3, or p4, has a value in the integral image 44 as described above for points 62 in FIG. 5.

The integral image 44 contains all the information necessary to compute a box car sum of the original image 22 in constant time. The box car sum is the sum of the pixels inside of the rectangular region denoted by its boundary points (x1, y1, x2, y2). The evaluation function f for a rectangular feature 54 computes the sum over a large box (e.g., box 70) without any additional computational effort than computing the sum over a small box (e.g., 76).

Point p1 contains (i.e., the value of p1 is) the sum of the pixels in box 70. Point p2 contains the sum of the pixels in boxes 70 and 72. Point p3 contains the sum of the pixels in boxes 70 and 74. Finally, point p4 contains the sum of the pixels in boxes 70, 72, 74 and 76. If the evaluation function f for a feature 54 is computing the sum of the pixels just in box 76, the evaluation function f only needs to compute p1−p2−p3+p4.

The classifier 30 uses the integral image 44 and rectangle sums to evaluate, in a preferred embodiment, the features 54. In a preferred embodiment, the object detector 28 uses a cascade of such classifiers 30, as will be described in more detail later (see FIG. 7).

The classifier 30 (classification function) is designed to operate using rectangular features 54 (also termed box car averages) for two reasons. One reason is that a rectangular feature 54 contains more information and is more robust than evaluating the values of single pixels. The second reason is that by using the integral image representation 44, rectangular features 54 can be computed at any scale in constant time. In other words, larger rectangular features 54 take the same time to compute as smaller ones. Hence, no additional processing is necessary to evaluate a classifier 30 at any scale (i.e., any size subwindow 42). In other words, rather than computing many scaled versions of the original image 22 (i.e., construct an image pyramid as is done with prior art approaches) which is then divided into 16 pixel×16 pixel (or other size) patches, the approach of the present invention uses the same integral image 44 for computation at each scale. Object detection at different scales is achieved by scaling the classifier 30 itself (see below).

In a preferred embodiment, a feature 54 has weights associated with each box in the feature 54 so that the sum of the weights in a feature 54 is zero. For example, each three rectangle (triplet) feature (e.g., 54C in FIG. 3) is computed as the weighted sum (−1, 2, −1) of three identical, adjacent and non-overlapping rectangular sums arranged either vertically or horizontally. For the triplet feature 54C in FIG. 3, the sum of pixels in box 54C-1 has a weight of −1; the sum of pixels in box 54C-2 has a weight of 2; and the sum of pixels in box 54C-3 has a weight of −1.

The set of all possible features 54 (from which any given classifier 30 will use only a few) is the set of all features 54 which will fit, in a preferred embodiment, within a 16 pixel×16 pixel patch (there are approximately 80,000 such features 54). Note that all of these operations can be computed using fixed point (integer) representations. This allows for implementations on very simple microprocessors and gate arrays.

Given the rectangular feature 54 representation, the image scanner 32 scans the classifier 30 across locations in the integral image 44 and scales by shifting and scaling the boundary points of the features 54. In other words, the object detector 28 precomputes the classifier 30 (classification function) for each scale, and then the scanner 32 need only scan the appropriately scaled classifier 30 for the given scale across locations in the integral image 44 at run time. In a preferred embodiment, the object detector 28 scales the size of each feature 54 in a classifier 30 proportionately to the desired scale. Also, the object detector 28 scales the value of the threshold T for each feature 54 accordingly to correspond to the change in scale. Thus, the object detector 28 creates a scaled classifier 30 by scaling all of the features 54 and adjusting the thresholds T for each feature 54 appropriately.

Figure 7:
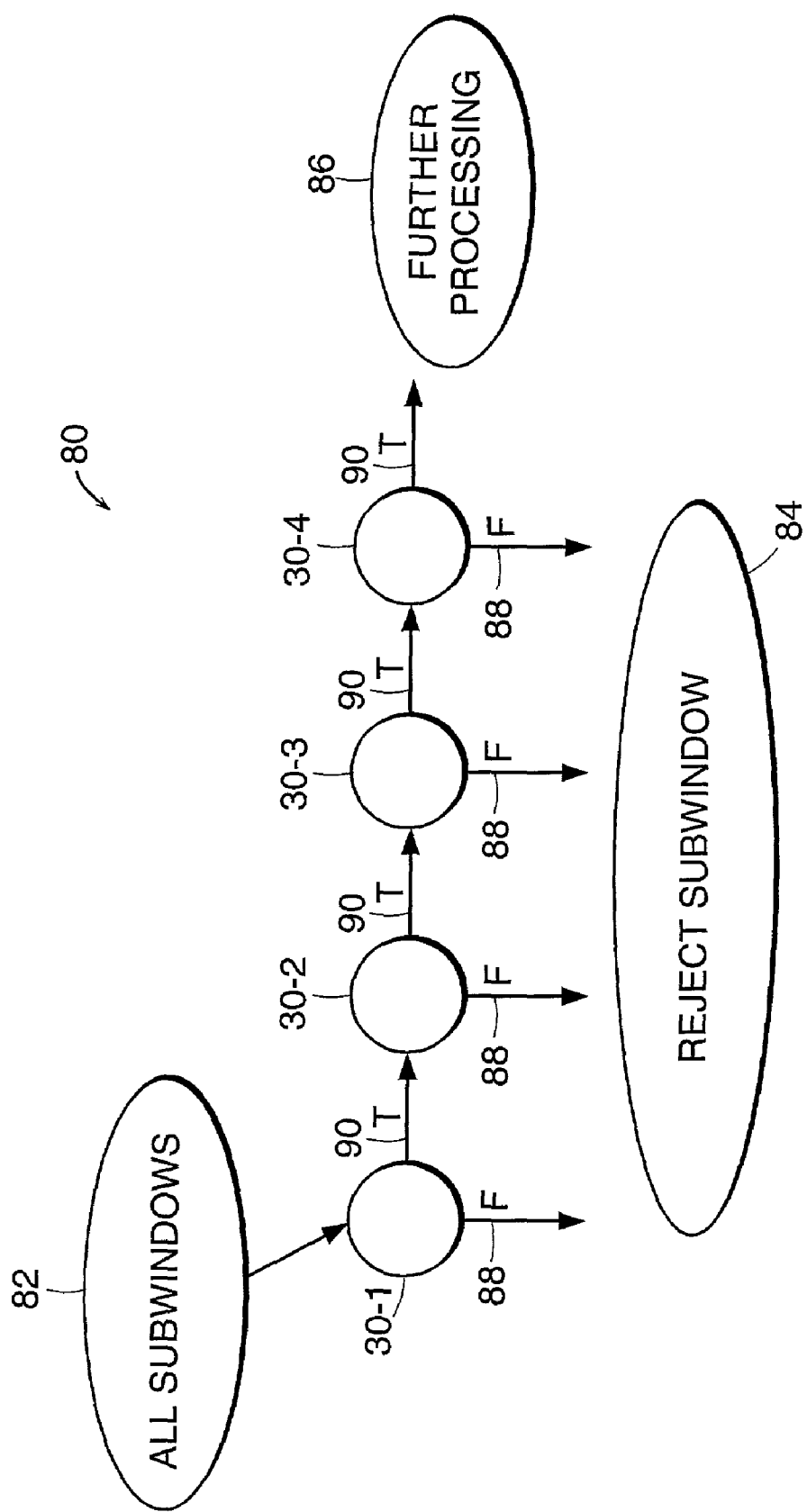
FIG. 7 is a schematic diagram of an object detection cascade according to the present invention.

FIG. 7 is a schematic diagram of a cascade 80 of classifiers 30-1, 30-2, 30-3, 30-4 (classification functions) for a preferred embodiment of the invention. The object detector 28 uses the cascade 80 to detect one or more instances 38 of an object in an image 22. The cascade 80 applies the series of classifiers 30-1, 30-2, 30-3, 30-4 to every subwindow 42 provided in the initial set of subwindows 82, which represents all of the subwindows 42 in the image 22 as determined by the image scanner 32. The initial classifier 30-1 eliminates a large number of negative examples (e.g., subwindows 42 without instances 38 of an object) with very little processing. The initial classifier 30-1 utilizes a limited number of features 54 (e.g, one to five features 54) to identify a large percentage, such as 50%, of the initial set of subwindows 82 which are unlikely to have any instances 38 of the object. For example, if the initial image 22 is a photograph with a large area representing a white wall, then the initial classifier 30-1 eliminates the subwindows 42 that cover the area of that white wall. In FIG. 7, this elimination process 88 is indicated by the letter "F" for "False", and the rejected set of subwindows 84 indicates those subwindows 42 eliminated by the classifiers 30-1, 30-2, 30-3, and 30-4, respectively. The retention 90 of windows is indicated by the letter "T" for "True", as the classifiers 30-1, 30-2, 30-3, and 30-4 pass on subwindows 42 that are not eliminated. After the classifier 30-4, the retained subwindows 42 are passed on for further processing 86, such as processing by additional classifiers 30 in the cascade 80 or for output processing such as highlighting the instances 38 of objects in an output image 34 for viewing by an end-user of the object detection system 20.

The later classifiers 30-2, 30-3, and 30-4 eliminate additional negatives (e.g., rejected subwindows 84) but require additional computation than what was required for the initial classifier 30-1. The initial classifier 30-1 removes rejected subwindows 84 that are easiest to reject, such as those with no distinguishing features 54 in the subwindows 84. At later stages, the classifiers 30-2, 30-3, and 30-4 require more work, as indicated by evaluating progressively larger numbers of features 54 in each classifier 30-2, 30-3, and 30-4.

For example, the first classifier 30-1 evaluates one or two features 54 and may eliminate one half of the initial set of subwindows 82. Eliminating one-half of the negative examples applies to the example of faces and may not hold for other objects. The second classifier 30-2 evaluates five features 54 and eliminates one half of the subwindows 42 that the second classifier 30-2 receives from the first classifier 30-1. The proportion of subwindows 42 that are retained is referred to as the false positive rate (e.g., one-half). Thus, the third classifier 30-3 receives one quarter (the false positive rate) of the initial set of subwindows 82. The third classifier 30-3 evaluates 10 features 54 and eliminates further rejected subwindows 84. By the end of a cascade 80 the last classifier 30 (e.g., 30-4) may process 100 features 54 to eliminate one-half of the retained subwindows 42 that the last classifier 30 has received. However, the processing by the last classifier 30 does not take a large amount of computing time (e.g., compared to what would be required to process all of the subwindows 82), because the last classifier 30 receives a relatively small number of retained subwindows 42 out of the large set of all subwindows 82 received by the initial classifier 30-1.

In a preferred embodiment, the cascade has about 35 classifiers 30 and the last classifier 30 in the cascade 80 processes about 200 to 300 features 54. In other words, as more and more windows 42 are eliminated to the set of rejected subwindows 84, the classifier 30 in the later stages (e.g., 30-2, 30-3, and 30-4) must process more features 54 to distinguish the instances 38 of an object (e.g., a human face) from other objects (e.g., a dog's face) and patterns in general (e.g., the folds of cloth in clothing).

In one example, the cascade 80 includes six classifiers 30 with 2, 20, 100, 200, 250, and 400 features 54 respectively. This cascade 80 is significantly faster than a 20 feature 54 classifier 30 running alone, but this cascade 80 has a much better classification performance (i.e., much more accurate detection of instances 38 of objects).

Each classifier 30 is based on the equations (1) and (2) given above, but with differing values for the number, N, of features 54 evaluated, the weights, $w_j$, feature thresholds, $T_j$, and the global threshold, $\theta$. Thus, in a preferred embodiment, all of the classifiers 30 in a cascade 80 are homogenous (that is, homogeneous classification functions). That is, they are made up of the same types of functions and equations as indicated by equations (1) and (2).

The techniques of the present invention use a learning phase to determine the differing values for the number, N, of features 54 evaluated, the weights, $w_j$, feature thresholds, $T_j$, and the global threshold, $\theta$, for each classifier 30. Each classifier 30 is trained based on a training data set. Typically, the training data set is a large number of different photographs with varying instances 38 of the object. In one embodiment, the learning phase is based on perceptron principles. In a preferred embodiment, a training server 37 performs the learning phase and provides the classifiers 30 to be used by the object detector 28. But after the learning phase, the training server 37 does not participate in the processing of the input images 22.

In a preferred embodiment, the learning phase for the initial training of each classifier 30 (classification function) is based on the AdaBoost learning procedure. For example, see Freund & Schapire, "Experiments with a New Boosting Algorithm," *Machine Learning: Proceedings of the Thirteenth International Conference,* 1996.

In a preferred embodiment, the AdaBoost approach is used both to select a small set of features 54 for each classifier 30 and to perform the initial training of the classifier 30. The learning phase uses the AdaBoost learning procedure to determine the number, N, of features 54 evaluated, the weights, $w_j$, feature thresholds, $T_j$, and the global threshold, $\theta$ for each classifier 30, thus producing optimal homogeneous classification functions 30.

The AdaBoost learning procedure selects from among the potential features 54 available in a subwindow 42. The AdaBoost learning procedure insures (under reasonable conditions) that the training error will eventually go to zero, and that the generalization error on a test set (used for training in the learning phase) will be reduced as the number of features 54 (in a classifier 30) is increased.

The AdaBoost learning technique is used to boost the classification performance of a simple learning algorithm (e.g., it might be used to boost the performance of a simple perceptron). AdaBoost does this by combining a collection of weak classification functions to form a strong classification function or classifier (a classification function or classifier 30 as described herein). As described above for equation (1), the threshold function, $h_j$, is considered a weak classification function (e.g., that represents a weak classifier based on one feature 54 only). The AdaBoost approach determines the optimal threshold function, $h_j$, for each feature 54, such that the minimum number of examples are misclassified.

The AdaBoost approach also determines the classification function or classifier 30 represented by equation (2), which represents the sum of weak classification functions (e.g., weak classifiers or threshold functions) $h_j$, determining the values for the weights, $w_j$, and the global threshold $\theta$. See the Appendix for more information on the AdaBoost learning technique in the preferred embodiment of the invention.

In general, the cascade 80 is constructed by initially training classifiers 30 using AdaBoost which provides an initial set of default global thresholds $\theta$.

Then, in a further training phase of the classifiers 30 after the initial training of the classifiers 30, the techniques of the present invention adjust the global threshold $\theta$ for each classifier 30 to minimize false negatives (that is, rejecting subwindows 42 that do have instances 38 of the object in them). The default global threshold $\theta$ is designed to yield a low error rate on the training data. In general, a lower global threshold θ yields higher detection rates and higher false positive rates.

Using the present invention, the goal is, for each stage of the cascade 80, to obtain a high detection rate (i.e., few or no false negatives) and a minimal false positive rate. For example, a first stage classifier (30-1 in FIG. 7) can be constructed from a two-feature strong classifier 30 by reducing the global threshold, θ, to minimize false negatives. Measured against a validation training set, the global threshold, θ, can be adjusted to detect 100% of the instances 38 of objects with a false positive rate of 40% for the example of detecting faces.

In the approach of the present invention, each stage (i.e., classifier 30) in the cascade 80 reduces the false positive rate significantly while not lowering or lowering only slightly the detection rate. A target is selected (e.g., by a designer or programmer of the object detection system 20) for the minimum reduction in false positives and the maximum acceptable decrease in detection rate. The learning phase trains each stage (classifier 30) by adding features 54 until the target detection and false positive rates are met (these rates are determined by testing on a validation set). Stages (classifiers 30) are added to the cascade 80 until the overall target for false positive and detection rates are met. The correct detection rate (of subwindows 42 with instances 38 of objects) can be compared to the false positive rate by plotting the correct detection rate against the false positive rate in a ROC (receiver operating characteristic) curve (see Appendix).

Figure 8:
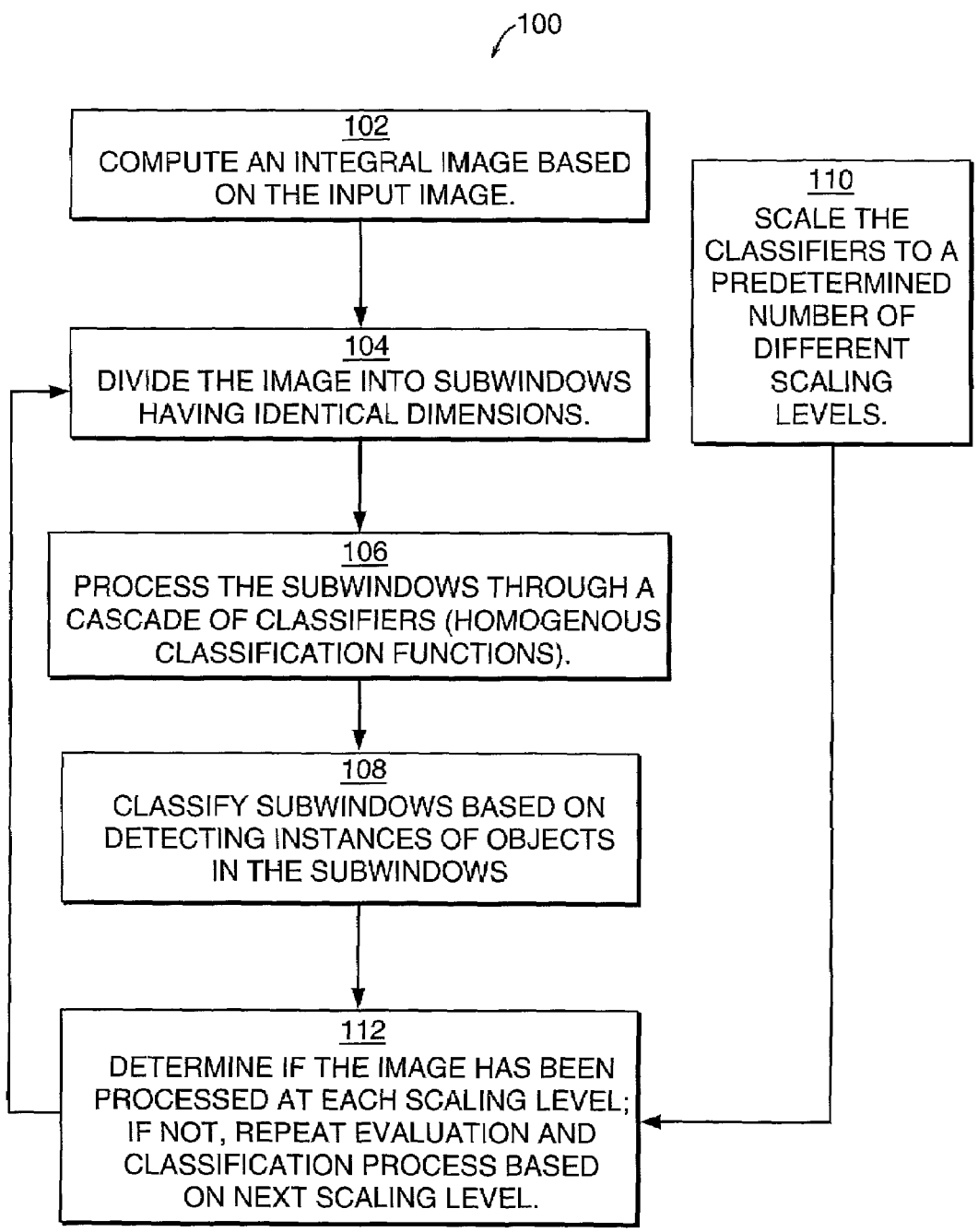
FIG. 8 is a flow chart of a procedure of detecting instances of objects in an image according to the present invention.

FIG. 8 is a flow chart of a procedure summarizing the steps for detecting instances 38 of objects in an image 22 according to the present invention. In step 102, the image integrator 26 receives the input image 22 and computes an integral image 44 based on the input image 22. The image integrator 26 computes the integral image 44 using the procedures or approach described for FIG. 5.

In step 104, the image scanner 32 divides the integral image 44 into subwindows 42, having identical dimensions. The image scanner 32 performs this division by placing a working window at different positions in the input image 22 such that the image 22 is divided into a number of subwindows 42 having the same dimensions.

At step 106, the object detector 28 evaluates the subwindows 42 by using a cascade 80 of homogeneous classification functions or classifiers 30, as described for FIG. 7. As described previously, the cascade 80 is a series of optimal homogeneous classification functions 30. Each of the homogeneous classification functions 30, in sequence in the cascade 80, has increasing accuracy in identifying features 54 associated with the objects. The classification function 30 evaluates the features 54 in each subwindow 42. The classification function 30 has been optimized in a learning phase based on a training data set as described previously, so that each classification function 30 is optimized to detect instances 38 of objects based on the features 54, depending on which stage of the cascade 80 the classification function 30 represents. The classification function 30 is optimized to be accurate, that is to detect instances 38 of objects in the subwindows 42, based on a number of features 54 for that classification function 30.

In step 108, the classification function 30 detects instances 38 of objects in the subwindows 42 based on the evaluation performed in step 106. Thus, the classification function 30 classifies each subwindow 42 as having an instance 38 of an object or as not having an instance 38 of an object. The procedure described so far in steps 102 through 108 describes how the object classification function 30 and cascade 80 perform based on one scale of detecting instances 38 of objects, that is detecting those instances 38 in one scale or one size of subwindows 42 that are based on dividing the image 22 into those same sized subwindows 42.

Thus, in step 110 (which may be performed earlier, such as before step 102) the object detector 28 scales the classification function 30 to different sizes and repeats the process of scaling, that is, based on a predefined number of scaling levels. Thus, the classification function 30 is in fact, increased in size for the next scaling level. This increase in size of the classification function 30 is accomplished by increasing the size of the features 54 that are part of the classification function 30 and also adjusting the feature threshold h appropriately for the adjustment in the size of scale. Thus, for any given increase in scale, which reflects an increase in the size of the subwindows 42, all of the classification functions 30 in the cascade 80 scale in a corresponding manner to the increasing scale to the subwindow size 42. In a preferred embodiment, the scaling of the classifiers (classification functions) 30 is done before scanning the image so that the classification functions 30 are already scaled to a certain number of scales, such as eight to ten different scaling levels in a preferred embodiment.

In step 112, the object detector 28 determines if the image 22 has been processed at each scaling level (for a predefined number of scaling levels). If not so, the object detector 28 repeats the process (steps 104-108) by returning to step 104. Then the procedure 100 returns to step 104 to repeat the process of dividing the image 22 into subwindows 42, having identical dimensions at the new scaled size of the subwindows 42. Then for that same scale, the procedure 100 proceeds through steps 106 and 108, as described above.

While this invention has been particularly shown and described with references to preferred embodiments thereof, it will be understood by those skilled in the art that various changes in form and details may be made therein without departing from the scope of the invention encompassed by the appended claims.

For example, the procedures of the present invention described herein could be partially or fully implemented in hardware such as a field programmable gate array (FPGA). The integral image representation 44 is computable with a few adder blocks. Detection at any given scale could be computed by streaming the integral image 44 through a FIFO (First In, First Out). Each feature 54 is then implemented using an ALU (Arithmetic Logic Unit) block.

In another example, features 54 may be composed of boxes that do not contact each other, so that a two rectangle feature 54 may include two independent boxes 42 at different parts of a feature (e.g., the top and the bottom of a subwindow 42).

In a further example, the object detection system 20 is part of desktop computer, personal computer, laptop computer, or other computing system. The object detection system 20 may also be part of a larger system, such as a security system for a company or other facility, such as an airport.

APPENDIX

The attached appendix "Rapid Object Detection Using a Boosted Cascade of Simple Features," describes one example of a preferred embodiment of the present invention, which is not limited in any way to the embodiment described in the Appendix.

APPENDIX

The attached appendix "Rapid Object Detection Using a Boosted Cascade of Simple Features," describes one example of a preferred embodiment of the present invention, which is not limited in any way to the embodiment described in the Appendix.

Rapid Object Detection using a Boosted Cascade of Simple Features

Paul Viola
viola@merl.com
Mitsubishi Electric Research Labs
201 Broadway, 8th FL
Cambridge, MA 02139

Michael Jones
michael.jones@compaq.com
Compaq Cambridge Research Lab
One Cambridge Center
Cambridge, MA 02142

Abstract

*This paper describes a machine learning approach for visual object detection which is capable of processing images extremely rapidly and achieving high detection rates. This work is distinguished by three key contributions. The first is the introduction of a new image representation called the "Integral Image" which allows the features used by our detector to be computed very quickly. The second is a learning algorithm, based on AdaBoost, which selects a small number of critical visual features from a larger set and yields extremely efficient classifiers[5]. The third contribution is a method for combining increasingly more complex classifiers in a "cascade" which allows background regions of the image to be quickly discarded while spending more computation on promising object-like regions. The cascade can be viewed as an object specific focus-of-attention mechanism which unlike previous approaches provides statistical guarantees that discarded regions are unlikely to contain the object of interest. In the domain of face detection the system yields detection rates comparable to the best previous systems. Used in real-time applications, the detector runs at 15 frames per second without resorting to image differencing or skin color detection.*

1. Introduction

This paper brings together new algorithms and insights to construct a framework for robust and extremely rapid object detection. This framework is demonstrated on, and in part motivated by, the task of face detection. Toward this end we have constructed a frontal face detection system which achieves detection and false positive rates which are equivalent to the best published results [14, 11, 13, 10, 1]. This face detection system is most clearly distinguished from previous approaches in its ability to detect faces extremely rapidly. Operating on 384 by 288 pixel images, faces are detected at 15 frames per second on a conventional 700 MHz Intel Pentium III. In other face detection systems, auxiliary information, such as image differences in video sequences, or pixel color in color images, have been used to achieve high frame rates. Our system achieves high frame rates working only with the information present in a single grey scale image. These alternative sources of information can also be integrated with our system to achieve even higher frame rates.

There are three main contributions of our object detection framework. We will introduce each of these ideas briefly below and then describe them in detail in subsequent sections.

The first contribution of this paper is a new image representation called an *integral image* that allows for very fast feature evaluation. Motivated in part by the work of Papageorgiou et al. our detection system does not work directly with image intensities [9]. Like these authors we use a set of features which are reminiscent of Haar Basis functions (though we will also use related filters which are more complex than Haar filters). In order to compute these features very rapidly at many scales we introduce the integral image representation for images. The integral image can be computed from an image using a few operations per pixel. Once computed, any one of these Harr-like features can be computed at any scale or location in *constant* time.

The second contribution of this paper is a method for constructing a classifier by selecting a small number of important features using AdaBoost [5]. Within any image subwindow the total number of Harr-like features is very large, far larger than the number of pixels. In order to ensure fast classification, the learning process must exclude a large majority of the available features, and focus on a small set of critical features. Motivated by the work of Tieu and Viola, feature selection is achieved through a simple modification of the AdaBoost procedure: the weak learner is constrained so that each weak classifier returned can depend on only a single feature [15]. As a result each stage of the boosting process, which selects a new weak classifier, can be viewed as a feature selection process. AdaBoost provides an effective learning algorithm and strong bounds on generalization performance [12, 8, 9].

The third major contribution of this paper is a method for combining successively more complex classifiers in a cascade structure which dramatically increases the speed of the detector by focusing attention on promising regions of the image. The notion behind focus of attention approaches is that it is often possible to rapidly determine where in an image an object might occur [16, 7, 1]. More complex processing is reserved only for these promising regions. The key measure of such an approach is the "false negative" rate of the attentional process. It must be the case that all, or almost all, object instances are selected by the attentional filter.

We will describe a process for training an extremely simple and efficient classifier which can be used as a "supervised" focus of attention operator. The term supervised refers to the fact that the attentional operator is trained to detect examples of a particular class. In the domain of face detection it is possible to achieve fewer than 1% false negatives and 40% false positives using a classifier constructed from two Harr-like features. The effect of this filter is to reduce by over one half the number of locations where the final detector must be evaluated.

Those sub-windows which are not rejected by the initial classifier are processed by a sequence of classifiers, each slightly more complex than the last. If any classifier rejects the sub-window, no further processing is performed. The structure of the cascaded detection process is essentially that of a degenerate decision tree, and as such is related to the work of Geman and colleagues [1, 3].

An extremely fast face detector will have broad practical applications. These include user interfaces, image databases, and teleconferencing. In applications where rapid frame-rates are not necessary, our system will allow for significant additional post-processing and analysis. In addition our system can be implemented on a wide range of small low power devices, including hand-helds and embedded processors. In our lab we have implemented this face detector on the Compaq iPaq handheld and have achieved detection at two frames per second (this device has a low power 200 MIPS *Strong Arm* processor which lacks floating point hardware).

The remainder of the paper describes our contributions and a number of experimental results, including a detailed description of our experimental methodology. Discussion of closely related work takes place at the end of each section.

2. Features

Our object detection procedure classifies images based on the value of simple features. There are many motivations for using features rather than the pixels directly. The most common reason is that features can act to encode ad-hoc domain knowledge that is difficult to learn using a finite quantity of training data. For this system there is also a second critical motivation for features: the feature based system operates much faster than a pixel-based system.

The simple features used are reminiscent of Haar basis functions which have been used by Papageorgiou et al. [9].

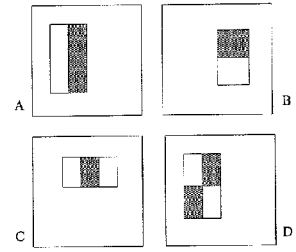

Figure 1: Example rectangle features shown relative to the enclosing detection window. The sum of the pixels which lie within the white rectangles are subtracted from the sum of pixels in the grey rectangles. Two-rectangle features are shown in (A) and (B). Figure (C) shows a three-rectangle feature, and (D) a four-rectangle feature.

More specifically, we use three kinds of features. The value of a *two-rectangle feature* is the difference between the sum of the pixels within two rectangular regions. The regions have the same size and shape and are horizontally or vertically adjacent (see Figure 1). A *three-rectangle feature* computes the sum within two outside rectangles subtracted from the sum in a center rectangle. Finally a *four-rectangle feature* computes the difference between diagonal pairs of rectangles.

Given that the base resolution of the detector is 24x24, the exhaustive set of rectangle features is quite large, over 180,000 . Note that unlike the Haar basis, the set of rectangle features is overcomplete[1].

2.1. Integral Image

Rectangle features can be computed very rapidly using an intermediate representation for the image which we call the integral image.[2] The integral image at location $x, y$ contains the sum of the pixels above and to the left of $x, y$, inclusive:

$$ii(x,y) = \sum_{x' \leq x, y' \leq y} i(x', y'),$$

where $ii(x, y)$ is the integral image and $i(x, y)$ is the original image. Using the following pair of recurrences:

$$s(x, y) = s(x, y-1) + i(x, y) \quad (1)$$
$$ii(x, y) = ii(x-1, y) + s(x, y) \quad (2)$$

(where $s(x, y)$ is the cumulative row sum, $s(x, -1) = 0$, and $ii(-1, y) = 0$) the integral image can be computed in one pass over the original image.

---
[1] A complete basis has no linear dependence between basis elements and has the same number of elements as the image space, in this case 576. The full set of 180,000 thousand features is many times over-complete.

[2] There is a close relation to "summed area tables" as used in graphics [2]. We choose a different name here in order to emphasize its use for the analysis of images, rather than for texture mapping.

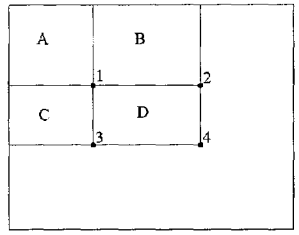

Figure 2: The sum of the pixels within rectangle $D$ can be computed with four array references. The value of the integral image at location 1 is the sum of the pixels in rectangle $A$. The value at location 2 is $A + B$, at location 3 is $A + C$, and at location 4 is $A + B + C + D$. The sum within $D$ can be computed as $4 + 1 - (2 + 3)$.

Using the integral image any rectangular sum can be computed in four array references (see Figure 2). Clearly the difference between two rectangular sums can be computed in eight references. Since the two-rectangle features defined above involve adjacent rectangular sums they can be computed in six array references, eight in the case of the three-rectangle features, and nine for four-rectangle features.

2.2. Feature Discussion

Rectangle features are somewhat primitive when compared with alternatives such as steerable filters [4, 6]. Steerable filters, and their relatives, are excellent for the detailed analysis of boundaries, image compression, and texture analysis. In contrast rectangle features, while sensitive to the presence of edges, bars, and other simple image structure, are quite coarse. Unlike steerable filters the only orientations available are vertical, horizontal, and diagonal. The set of rectangle features do however provide a rich image representation which supports effective learning. In conjunction with the integral image, the efficiency of the rectangle feature set provides ample compensation for their limited flexibility.

3. Learning Classification Functions

Given a feature set and a training set of positive and negative images, any number of machine learning approaches could be used to learn a classification function. In our system a variant of AdaBoost is used both to select a small set of features and train the classifier [5]. In its original form, the AdaBoost learning algorithm is used to boost the classification performance of a simple (sometimes called weak) learning algorithm. There are a number of formal guarantees provided by the AdaBoost learning procedure. Freund and Schapire proved that the training error of the strong classifier approaches zero exponentially in the number of rounds. More importantly a number of results were later proved about generalization performance [12]. The key insight is that generalization performance is related to the margin of the examples, and that AdaBoost achieves large margins rapidly.

Recall that there are over 180,000 rectangle features associated with each image sub-window, a number far larger than the number of pixels. Even though each feature can be computed very efficiently, computing the complete set is prohibitively expensive. Our hypothesis, which is borne out by experiment, is that a very small number of these features can be combined to form an effective classifier. The main challenge is to find these features.

In support of this goal, the weak learning algorithm is designed to select the single rectangle feature which best separates the positive and negative examples (this is similar to the approach of [15] in the domain of image database retrieval). For each feature, the weak learner determines the optimal threshold classification function, such that the minimum number of examples are misclassified. A weak classifier $h_j(x)$ thus consists of a feature $f_j$, a threshold $\theta_j$ and a polarity $p_j$ indicating the direction of the inequality sign:

$$h_j(x) = \begin{cases} 1 & \text{if } p_j f_j(x) < p_j \theta_j \\ 0 & \text{otherwise} \end{cases}$$

Here $x$ is a 24x24 pixel sub-window of an image. See Figure 3 for a summary of the boosting process.

In practice no single feature can perform the classification task with low error. Features which are selected in early rounds of the boosting process had error rates between 0.1 and 0.3. Features selected in later rounds, as the task becomes more difficult, yield error rates between 0.4 and 0.5.

3.1. Learning Discussion

Many general feature selection procedures have been proposed (see chapter 8 of [17] for a review). Our final application demanded a very aggressive approach which would discard the vast majority of features. For a similar recognition problem Papageorgiou et al. proposed a scheme for feature selection based on feature variance [9]. They demonstrated good results selecting 37 features out of a total 1734 features.

Roth et al. propose a feature selection process based on the Winnow exponential perceptron learning rule [10]. The Winnow learning process converges to a solution where many of these weights are zero. Nevertheless a very large number of features are retained (perhaps a few hundred or thousand).

3.2. Learning Results

While details on the training and performance of the final system are presented in Section 5, several simple results merit discussion. Initial experiments demonstrated that a

- Given example images $(x_1, y_1), \ldots, (x_n, y_n)$ where $y_i = 0, 1$ for negative and positive examples respectively.
- Initialize weights $w_{1,i} = \frac{1}{2m}, \frac{1}{2l}$ for $y_i = 0, 1$ respectively, where $m$ and $l$ are the number of negatives and positives respectively.
- For $t = 1, \ldots, T$:
  1. Normalize the weights,
  $$w_{t,i} \leftarrow \frac{w_{t,i}}{\sum_{j=1}^{n} w_{t,j}}$$
  so that $w_t$ is a probability distribution.
  2. For each feature, $j$, train a classifier $h_j$ which is restricted to using a single feature. The error is evaluated with respect to $w_t$, $\epsilon_j = \sum_i w_i |h_j(x_i) - y_i|$.
  3. Choose the classifier, $h_t$, with the lowest error $\epsilon_t$.
  4. Update the weights:
  $$w_{t+1,i} = w_{t,i} \beta_t^{1-e_i}$$
  where $e_i = 0$ if example $x_i$ is classified correctly, $e_i = 1$ otherwise, and $\beta_t = \frac{\epsilon_t}{1-\epsilon_t}$.
- The final strong classifier is:
$$h(x) = \begin{cases} 1 & \sum_{t=1}^{T} \alpha_t h_t(x) \geq \frac{1}{2} \sum_{t=1}^{T} \alpha_t \\ 0 & \text{otherwise} \end{cases}$$
where $\alpha_t = \log \frac{1}{\beta_t}$ Figure 3: The AdaBoost algorithm for classifier learning. Each round of boosting selects one feature from the 180,000 potential features.

frontal face classifier constructed from 200 features yields a detection rate of 95% with a false positive rate of 1 in 14084. These results are compelling, but not sufficient for many real-world tasks. In terms of computation, this classifier is probably faster than any other published system, requiring 0.7 seconds to scan an 384 by 288 pixel image. Unfortunately, the most straightforward technique for improving detection performance, adding features to the classifier, directly increases computation time.

For the task of face detection, the initial rectangle features selected by AdaBoost are meaningful and easily interpreted. The first feature selected seems to focus on the property that the region of the eyes is often darker than the region of the nose and cheeks (see Figure 4). This feature is relatively large in comparison with the detection sub-window, and should be somewhat insensitive to size and location of the face. The second feature selected relies on the property that the eyes are darker than the bridge of the nose.

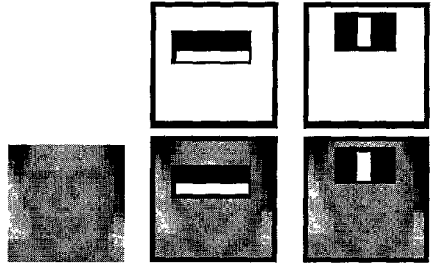

Figure 4: The first and second features selected by AdaBoost. The two features are shown in the top row and then overlayed on a typical training face in the bottom row. The first feature measures the difference in intensity between the region of the eyes and a region across the upper cheeks. The feature capitalizes on the observation that the eye region is often darker than the cheeks. The second feature compares the intensities in the eye regions to the intensity across the bridge of the nose.

4. The Attentional Cascade

This section describes an algorithm for constructing a cascade of classifiers which achieves increased detection performance while radically reducing computation time. The key insight is that smaller, and therefore more efficient, boosted classifiers can be constructed which reject many of the negative sub-windows while detecting almost all positive instances (i.e. the threshold of a boosted classifier can be adjusted so that the false negative rate is close to zero). Simpler classifiers are used to reject the majority of sub-windows before more complex classifiers are called upon to achieve low false positive rates.

The overall form of the detection process is that of a degenerate decision tree, what we call a "cascade" (see Figure 5). A positive result from the first classifier triggers the evaluation of a second classifier which has also been adjusted to achieve very high detection rates. A positive result from the second classifier triggers a third classifier, and so on. A negative outcome at any point leads to the immediate rejection of the sub-window.

Stages in the cascade are constructed by training classifiers using AdaBoost and then adjusting the threshold to minimize false negatives. Note that the default AdaBoost threshold is designed to yield a low error rate on the training data. In general a lower threshold yields higher detection rates and higher false positive rates.

For example an excellent first stage classifier can be constructed from a two-feature strong classifier by reducing the threshold to minimize false negatives. Measured against a validation training set, the threshold can be adjusted to detect 100% of the faces with a false positive rate of 40%. See

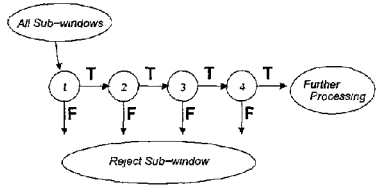

Figure 5: Schematic depiction of a the detection cascade. A series of classifiers are applied to every sub-window. The initial classifier eliminates a large number of negative examples with very little processing. Subsequent layers eliminate additional negatives but require additional computation. After several stages of processing the number of sub-windows have been reduced radically. Further processing can take any form such as additional stages of the cascade (as in our detection system) or an alternative detection system.

Figure 4 for a description of the two features used in this classifier.

Computation of the two feature classifier amounts to about 60 microprocessor instructions. It seems hard to imagine that any simpler filter could achieve higher rejection rates. By comparison, scanning a simple image template, or a single layer perceptron, would require at least 20 times as many operations per sub-window.

The structure of the cascade reflects the fact that within any single image an overwhelming majority of sub-windows are negative. As such, the cascade attempts to reject as many negatives as possible at the earliest stage possible. While a positive instance will trigger the evaluation of every classifier in the cascade, this is an exceedingly rare event.

Much like a decision tree, subsequent classifiers are trained using those examples which pass through all the previous stages. As a result, the second classifier faces a more difficult task than the first. The examples which make it through the first stage are "harder" than typical examples. The more difficult examples faced by deeper classifiers push the entire receiver operating characteristic (ROC) curve downward. At a given detection rate, deeper classifiers have correspondingly higher false positive rates.

4.1. Training a Cascade of Classifiers

The cascade training process involves two types of tradeoffs. In most cases classifiers with more features will achieve higher detection rates and lower false positive rates. At the same time classifiers with more features require more time to compute. In principle one could define an optimization framework in which: i) the number of classifier stages, ii) the number of features in each stage, and iii) the threshold of each stage, are traded off in order to minimize the expected number of evaluated features. Unfortunately finding this optimum is a tremendously difficult problem.

In practice a very simple framework is used to produce an effective classifier which is highly efficient. Each stage in the cascade reduces the false positive rate and decreases the detection rate. A target is selected for the minimum reduction in false positives and the maximum decrease in detection. Each stage is trained by adding features until the target detection and false positives rates are met (these rates are determined by testing the detector on a validation set). Stages are added until the overall target for false positive and detection rate is met.

4.2. Detector Cascade Discussion

The complete face detection cascade has 38 stages with over 6000 features. Nevertheless the cascade structure results in fast average detection times. On a difficult dataset, containing 507 faces and 75 million sub-windows, faces are detected using an average of 10 feature evaluations per sub-window. In comparison, this system is about 15 times faster than an implementation of the detection system constructed by Rowley et al.[3] [11]

A notion similar to the cascade appears in the face detection system described by Rowley et al. in which two detection networks are used [11]. Rowley et al. used a faster yet less accurate network to prescreen the image in order to find candidate regions for a slower more accurate network. Though it is difficult to determine exactly, it appears that Rowley et al.'s two network face system is the fastest existing face detector.[4]

The structure of the cascaded detection process is essentially that of a degenerate decision tree, and as such is related to the work of Amit and Geman [1]. Unlike techniques which use a fixed detector, Amit and Geman propose an alternative point of view where unusual co-occurrences of simple image features are used to trigger the evaluation of a more complex detection process. In this way the full detection process need not be evaluated at many of the potential image locations and scales. While this basic insight is very valuable, in their implementation it is necessary to first evaluate some feature detector at every location. These features are then grouped to find unusual co-occurrences. In practice, since the form of our detector and the features that it uses are extremely efficient, the amortized cost of evaluating our detector at *every scale and location* is much faster than finding and grouping edges throughout the image.

In recent work Fleuret and Geman have presented a face detection technique which relies on a "chain" of tests in order to signify the presence of a face at a particular scale and

---

[3] Henry Rowley very graciously supplied us with implementations of his detection system for direct comparison. Reported results are against his fastest system. It is difficult to determine from the published literature, but the Rowley-Baluja-Kanade detector is widely considered the fastest detection system and has been heavily tested on real-world problems.

[4] Other published detectors have either neglected to discuss performance in detail, or have never published detection and false positive rates on a large and difficult training set.

Figure 6: Example of frontal upright face images used for training.

location [3]. The image properties measured by Fleuret and Geman, disjunctions of fine scale edges, are quite different than rectangle features which are simple, exist at all scales, and are somewhat interpretable. The two approaches also differ radically in their learning philosophy. The motivation for Fleuret and Geman's learning process is density estimation and density discrimination, while our detector is purely discriminative. Finally the false positive rate of Fleuret and Geman's approach appears to be higher than that of previous approaches like Rowley et al. and this approach. Unfortunately the paper does not report quantitative results of this kind. The included example images each have between 2 and 10 false positives.

5 Results

A 38 layer cascaded classifier was trained to detect frontal upright faces. To train the detector, a set of face and non-face training images were used. The face training set consisted of 4916 hand labeled faces scaled and aligned to a base resolution of 24 by 24 pixels. The faces were extracted from images downloaded during a random crawl of the world wide web. Some typical face examples are shown in Figure 6. The non-face subwindows used to train the detector come from 9544 images which were manually inspected and found to not contain any faces. There are about 350 million subwindows within these non-face images.

The number of features in the first five layers of the detector is 1, 10, 25, 25 and 50 features respectively. The remaining layers have increasingly more features. The total number of features in all layers is 6061.

Each classifier in the cascade was trained with the 4916 training faces (plus their vertical mirror images for a total of 9832 training faces) and 10,000 non-face sub-windows (also of size 24 by 24 pixels) using the Adaboost training procedure. For the initial one feature classifier, the non-face training examples were collected by selecting random sub-windows from a set of 9544 images which did not contain faces. The non-face examples used to train subsequent layers were obtained by scanning the partial cascade across the non-face images and collecting false positives. A maximum of 10,000 such non-face sub-windows were collected for each layer.

Speed of the Final Detector

The speed of the cascaded detector is directly related to the number of features evaluated per scanned sub-window. Evaluated on the MIT+CMU test set [11], an average of 10 features out of a total of 6061 are evaluated per sub-window. This is possible because a large majority of sub-windows are rejected by the first or second layer in the cascade. On a 700 Mhz Pentium III processor, the face detector can process a 384 by 288 pixel image in about .067 seconds (using a starting scale of 1.25 and a step size of 1.5 described below). This is roughly 15 times faster than the Rowley-Baluja-Kanade detector [11] and about 600 times faster than the Schneiderman-Kanade detector [13].

Image Processing

All example sub-windows used for training were variance normalized to minimize the effect of different lighting conditions. Normalization is therefore necessary during detection as well. The variance of an image sub-window can be computed quickly using a pair of integral images. Recall that $\sigma^2 = m^2 - \frac{1}{N}\sum x^2$, where $\sigma$ is the standard deviation, $m$ is the mean, and $x$ is the pixel value within the sub-window. The mean of a sub-window can be computed using the integral image. The sum of squared pixels is computed using an integral image of the image squared (i.e. two integral images are used in the scanning process). During scanning the effect of image normalization can be achieved by post-multiplying the feature values rather than pre-multiplying the pixels.

Scanning the Detector

The final detector is scanned across the image at multiple scales and locations. Scaling is achieved by scaling the detector itself, rather than scaling the image. This process makes sense because the features can be evaluated at any scale with the same cost. Good results were obtained using a set of scales a factor of 1.25 apart.

The detector is also scanned across location. Subsequent locations are obtained by shifting the window some number of pixels $\Delta$. This shifting process is affected by the scale of the detector: if the current scale is $s$ the window is shifted by $[s\Delta]$, where $[]$ is the rounding operation.

The choice of $\Delta$ affects both the speed of the detector as well as accuracy. The results we present are for $\Delta = 1.0$. We can achieve a significant speedup by setting $\Delta = 1.5$ with only a slight decrease in accuracy.

Table 1: Detection rates for various numbers of false positives on the MIT+CMU test set containing 130 images and 507 faces.

| Detector \ False detections | 10 | 31 | 50 | 65 | 78 | 95 | 167 |
|---|---|---|---|---|---|---|---|
| Viola-Jones | 76.1% | 88.4% | 91.4% | 92.0% | 92.1% | 92.9% | 93.9% |
| Viola-Jones (voting) | 81.1% | 89.7% | 92.1% | 93.1% | 93.1% | 93.2% | 93.7% |
| Rowley-Baluja-Kanade | 83.2% | 86.0% | - | - | - | 89.2% | 90.1% |
| Schneiderman-Kanade | - | - | - | 94.4% | - | - | - |
| Roth-Yang-Ahuja | - | - | - | - | (94.8%) | - | - |

Integration of Multiple Detections

Since the final detector is insensitive to small changes in translation and scale, multiple detections will usually occur around each face in a scanned image. The same is often true of some types of false positives. In practice it often makes sense to return one final detection per face. Toward this end it is useful to postprocess the detected sub-windows in order to combine overlapping detections into a single detection.

In these experiments detections are combined in a very simple fashion. The set of detections are first partitioned into disjoint subsets. Two detections are in the same subset if their bounding regions overlap. Each partition yields a single final detection. The corners of the final bounding region are the average of the corners of all detections in the set.

Experiments on a Real-World Test Set

We tested our system on the MIT+CMU frontal face test set [11]. This set consists of 130 images with 507 labeled frontal faces. A ROC curve showing the performance of our detector on this test set is shown in Figure 7. To create the ROC curve the threshold of the final layer classifier is adjusted from $-\infty$ to $+\infty$. Adjusting the threshold to $+\infty$ will yield a detection rate of 0.0 and a false positive rate of 0.0. Adjusting the threshold to $-\infty$, however, increases both the detection rate and false positive rate, but only to a certain point. Neither rate can be higher than the rate of the detection cascade minus the final layer. In effect, a threshold of $-\infty$ is equivalent to removing that layer. Further increasing the detection and false positive rates requires decreasing the threshold of the next classifier in the cascade. Thus, in order to construct a complete ROC curve, classifier layers are removed. We use the *number* of false positives as opposed to the *rate* of false positives for the x-axis of the ROC curve to facilitate comparison with other systems. To compute the false positive rate, simply divide by the total number of sub-windows scanned. In our experiments, the number of sub-windows scanned is 75,081,800.

Unfortunately, most previous published results on face detection have only included a single operating regime (i.e. single point on the ROC curve). To make comparison with our detector easier we have listed our detection rate for the false positive rates reported by the other systems. Table 1

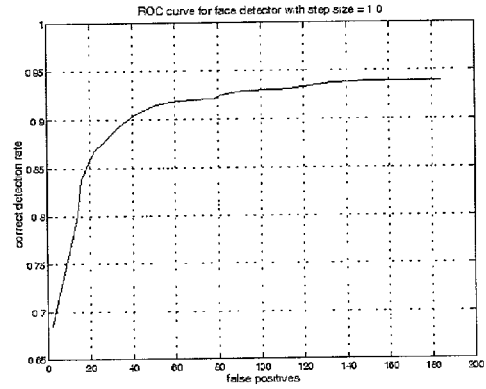

Figure 7: ROC curve for our face detector on the MIT+CMU test set. The detector was run using a step size of 1.0 and starting scale of 1.0 (75,081,800 sub-windows scanned).

lists the detection rate for various numbers of false detections for our system as well as other published systems. For the Rowley-Baluja-Kanade results [11], a number of different versions of their detector were tested yielding a number of different results they are all listed in under the same heading. For the Roth-Yang-Ahuja detector [10], they reported their result on the MIT+CMU test set minus 5 images containing line drawn faces removed.

Figure 8 shows the output of our face detector on some test images from the MIT+CMU test set.

A simple voting scheme to further improve results

In table 1 we also show results from running three detectors (the 38 layer one described above plus two similarly trained detectors) and outputting the majority vote of the three detectors. This improves the detection rate as well as eliminating more false positives. The improvement would be greater if the detectors were more independent. The correlation of their errors results in a modest improvement over the best single detector.

Figure 8: Output of our face detector on a number of test images from the MIT+CMU test set.

6 Conclusions

We have presented an approach for object detection which minimizes computation time while achieving high detection accuracy. The approach was used to construct a face detection system which is approximately 15 times faster than any previous approach.

This paper brings together new algorithms, representations, and insights which are quite generic and may well have broader application in computer vision and image processing.

Finally this paper presents a set of detailed experiments on a difficult face detection dataset which has been widely studied. This dataset includes faces under a very wide range of conditions including: illumination, scale, pose, and camera variation. Experiments on such a large and complex dataset are difficult and time consuming. Nevertheless systems which work under these conditions are unlikely to be brittle or limited to a single set of conditions. More importantly conclusions drawn from this dataset are unlikely to be experimental artifacts.

References

[1] Y. Amit, D. Geman, and K. Wilder. Joint induction of shape features and tree classifiers, 1997.

[2] F. Crow. Summed-area tables for texture mapping. In *Proceedings of SIGGRAPH*, volume 18(3), pages 207–212, 1984.

[3] F. Fleuret and D. Geman. Coarse-to-fine face detection. *Int. J. Computer Vision*, 2001.

[4] William T. Freeman and Edward H. Adelson. The design and use of steerable filters. *IEEE Transactions on Pattern Analysis and Machine Intelligence*, 13(9):891–906, 1991.

[5] Yoav Freund and Robert E. Schapire. A decision-theoretic generalization of on-line learning and an application to boosting. In *Computational Learning Theory: Eurocolt '95*, pages 23–37. Springer-Verlag, 1995.

[6] H. Greenspan, S. Belongie, R. Gooodman, P. Perona, S. Rakshit, and C. Anderson. Overcomplete steerable pyramid filters and rotation invariance. In *Proceedings of the IEEE Conference on Computer Vision and Pattern Recognition*, 1994.

[7] L. Itti, C. Koch, and E. Niebur. A model of saliency-based visual attention for rapid scene analysis. *IEEE Patt. Anal. Mach. Intell.*, 20(11):1254–1259, November 1998.

[8] Edgar Osuna, Robert Freund, and Federico Girosi. Training support vector machines: an application to face detection. In *Proceedings of the IEEE Conference on Computer Vision and Pattern Recognition*, 1997.

[9] C. Papageorgiou, M. Oren, and T. Poggio. A general framework for object detection. In *International Conference on Computer Vision*, 1998.

[10] D. Roth, M. Yang, and N. Ahuja. A snowbased face detector. In *Neural Information Processing 12*, 2000.

[11] H. Rowley, S. Baluja, and T. Kanade. Neural network-based face detection. In *IEEE Patt. Anal. Mach. Intell.*, volume 20, pages 22–38, 1998.

[12] Robert E. Schapire, Yoav Freund, Peter Bartlett, and Wee Sun Lee. Boosting the margin: A new explanation for the effectiveness of voting methods. In *Proceedings of the Fourteenth International Conference on Machine Learning*, 1997.

[13] H. Schneiderman and T. Kanade. A statistical method for 3D object detection applied to faces and cars. In *International Conference on Computer Vision*, 2000.

[14] K. Sung and T. Poggio. Example-based learning for view-based face detection. In *IEEE Patt. Anal. Mach. Intell.*, volume 20, pages 39–51, 1998.

[15] K. Tieu and P. Viola. Boosting image retrieval. In *Proceedings of the IEEE Conference on Computer Vision and Pattern Recognition*, 2000.

[16] J.K. Tsotsos, S.M. Culhane, W.Y.K. Wai, Y.H. Lai, N. Davis, and F. Nuflo. Modeling visual-attention via selective tuning. *Artificial Intelligence Journal*, 78(1-2):507–545, October 1995.

[17] Andrew Webb. *Statistical Pattern Recognition*. Oxford University Press, New York, 1999.

What is claimed is:

1. A method for detecting certain objects in an image, comprising the computer-implemented steps of:
   placing a working window at different positions in an input image such that the input image is divided into a plurality of same dimension subwindows;
   providing a cascade of homogeneous classifiers each represented by a respective homogenous classification function covering a plurality of features, each of the homogenous classification functions in sequence in the cascade respectively having increasing accuracy in identifying features associated with the certain objects such that one classifier identifies the plural features at one level of accuracy and a subsequent classifier in the cascade sequence identifies the same plural features at an increased level of accuracy with respect to the one classifier; and
   for each subwindow, employing the cascade of homogenous classification functions to quickly detect instances of the certain objects in the image in a manner enabling real-time application, said employing including discarding subwindows that insufficiently show features of the certain objects and continuing to process through the cascade only subwindows having sufficient features that indicate a likelihood of an instance of the certain objects in the subwindows.

2. The method of claim 1, further comprising a computer-implemented step of:
   scaling the dimensions of the subwindows by changing a size of the working window;
   scaling the homogenous classification functions respectively for each different size of the working window, and
   for each different size of the working window, repeating the steps of placing, providing, and employing.

3. The method of claim 1, further comprising a computer-implemented step of computing an integral image representation of the input image; and
   wherein the step of employing the cascade includes utilizing the integral image representation in computing the homogenous classification functions.

4. The method of claim 1, wherein the certain objects are human faces.

5. The method of claim 1, further comprising a computer-implemented step of training the homogenous classification functions in a learning phase based on a training data set and thereby identifying optimal such functions.

6. The method of claim 5, further comprising constructing the cascade based on the optimal homogenous classification functions such that the step of employing the cascade performs at an average processing rate of less than about 200 arithmetic operations for each subwindow.

7. The method of claim 6, wherein the processing rate is independent of the dimensions of the subwindows.

8. The method of claim 1, further comprising a computer-implemented step of providing to a computer output device an output image that identifies the detected instances of the certain objects based on the step of employing the cascade.

9. The method of claim 1, wherein each homogenous classification function is based on a number N of the features and a plurality of threshold functions $h_j$, each feature having one of the respective threshold functions $h_j$ identified respectively by an iterator j having values from j=1 to j=N, a given threshold function $h_j$ for a given feature defined as follows:

$$h_j = \begin{cases} 1, & \text{if } p_j f_j(x) > p_j T_j \\ 0, & \text{otherwise} \end{cases}$$

wherein x is a vector of pixel values in a given subwindow; wherein $f_j$ is an evaluation function for the given feature; wherein $T_j$ is a predefined feature threshold for the given feature indicating a presence of the given feature in the subwindow by assigning a value of 1 to the given threshold function $h_j$, and wherein $p_j$ is a polarity value having a value of +1 or −1; and
wherein each homogeneous classification function is based on a summation function defined as follows:

$$\sum_{j=1}^{N} w_j h_j(x) > \theta$$

wherein $w_j$ is a predefined weight for each threshold function $h_j$, and wherein $\theta$ is a predefined global threshold that determines whether or not the summation function indicates a detection of one of the instances of the certain object in the given subwindow.

10. The method of claim 1 wherein the features are composed of weighted sums of average pixel values of a plurality of rectangles within the subwindow.

11. The method of claim 1 wherein the step of employing includes quickly identifying and discarding subwindows that do not contain instances of the certain objects.

12. An object detection system for detecting certain objects in an image, comprising:
   an image scanner for placing a working window at different positions in an input image such that the input image is divided into a plurality of same dimension subwindows; and
   an object detector for providing a cascade of homogeneous classifiers each represented by a respective homogenous classification function covering a same plurality of features, each of the homogenous classification functions in sequence in the cascade respectively having increasing accuracy in identifying features associated with the certain objects such that one classifier identifies the plural features at one level of accuracy and a subsequent classifier in the cascade sequence identifies the same plural features at an increased level of accuracy with respect to the one classifier;
   the object detector employing, for each subwindow, the cascade of homogenous classification functions to quickly detect instances of the certain objects in the image in a manner enabling real-time application, including discarding a subwindow that insufficiently shows features of the certain objects and continuing to process through the cascade only subwindows having sufficient features that indicate a likelihood of an instance of the certain objects in the subwindows.

13. The object detection system of claim 12, wherein the image scanner scales the dimensions of the subwindows by changing a size of the working window; and
   wherein the object detector scales the homogenous classification functions respectively for each different size of the working window, and, for each different size of the working Window, (i) the image scanner repeats the placing of the scaled working window at different positions in the input image to divide the input image into a plurality of scaled same dimension subwindows, and (ii) the object detector repeats the employing of the cascade of scaled homogenous classification functions to detect the instances of the certain objects.

14. The object detection system of claim 12, further comprising an image integrator, wherein the image integrator computes an integral image representation of the input image; and wherein the object detector utilizes the integral image representation in computing the homogenous classification functions.

15. The object detection system of claim 12, wherein the certain objects are human faces.

16. The object detection system of claim 12, further comprising a training server, wherein the training server trains the homogenous classification functions in a learning phase based on a training data set and thereby identifying optimal such functions.

17. The object detection system of claim 16, wherein the training server constructs the cascade based on the optimal homogenous classification functions such that the object detector performs the employing of the cascade at an average processing rate of less than about 200 arithmetic operations for each subwindow.

18. The object detection system of claim 17, wherein the processing rate is independent of the dimensions of the subwindows.

19. The object detection system claim 12, wherein the object detector provides to a computer output device an output image that identifies the detected instances of the certain objects based on the employing of the cascade.

20. The object detection system of claim 12, wherein each homogenous classification function is based on a number N of the features and a plurality of threshold functions $h_j$, each feature having one of the respective threshold functions $h_j$ identified respectively by an iterator j having values from j=1 to j=N, a given threshold function $h_j$ for a given feature defined as follows:

$$h_j = \begin{cases} 1, \text{if } p_j f_j(x) > p_j T_j \\ 0, \text{otherwise} \end{cases}$$

wherein x is a vector of pixel values in a given subwindow; wherein $f_j$ is an evaluation function for the given feature; wherein $T_j$ is a predefined feature threshold for the given feature indicating a presence of the given feature in the subwindow by assigning a value of 1 to the given threshold function $h_j$, and wherein $p_j$ is a polarity value having a value of +1 or −1; and wherein each homogeneous classification function is based on a summation function defined as follows:

$$\sum_{j=1}^{N} w_j h_j(x) > \theta$$

wherein $w_j$ is a predefined weight for each threshold function $h_j$, and wherein $\theta$ is a predefined global threshold that determines whether or not the summation function indicates a detection of one of the instances of the certain object in the given subwindow.

21. The object detection system of claim 12, wherein the features are rectangular features.

22. An object detection as claimed in claim 11 wherein for each subwindow the object detector has twenty or fewer operations.

23. A computer program product comprising:
a computer usable medium for detecting certain objects in an image; and
a set of computer program instructions embodied on the computer useable medium, including instructions to:
place a working window at different positions in an input image such that the input image is divided into a plurality of same dimension subwindows;
provide a cascade of homogenous classifiers each represented by a respective homogeneous classification function covering a same plurality of features, each of the homogenous classification functions in sequence in the cascade respectively having increasing accuracy in identifying features associated with the certain objects such that one classifier identifies the plural features at one level of accuracy and a subsequent classifier in the cascade sequence identifies the same plural features at an increased level of accuracy with respect to the one classifier; and
for each subwindow, employ the cascade of homogenous classification functions to quickly detect instances of the certain objects in the image in a manner enabling real-time application, including discarding a subwindow that insufficiently shows features of the certain objects and continuing to process through the cascade only subwindows having sufficient features that indicate a likelihood of an instance of the certain objects in the subwindows.

24. A method for detecting certain objects in an image, comprising the computer-implemented steps of:
(i) dividing an input image into a plurality of subwindows, each subwindow having a sufficient size to allow processing of features associated with the certain objects; and
(ii) processing the subwindows at an average processing rate less than about 200 arithmetic operations for each subwindow by:
(a) for each subwindow, evaluating the features in the subwindow at one level of accuracy followed by evaluating the same features at increasing levels of accuracy; and
(b) classifying each subwindow to detect an instance of the certain objects based on the step of evaluating the features, such that instances of the certain objects are quickly detected enabling real-time application, said classifying including discarding a subwindow that insufficiently shows features of the certain objects and continuing to evaluate only subwindows having sufficient features that indicate a likelihood of an instance of the certain objects in the subwindows.

25. The method of claim 24, wherein the processing rate is independent of dimensions of the subwindows.

26. The method of claim 24, further comprising a computer-implemented step of computing an integral image representation of the input image and using the integral image representation to compute homogenous classification functions for use in the step of processing the subwindows.

27. The method of claim 24, wherein the step of processing the subwindows comprises:
for each subwindow, employing a cascade of optimal homogenous classification functions, each optimal homogenous classification function in sequence in the cascade respectively having increasing accuracy in identifying the features associated with the certain objects; and,
at each optimal homogenous classification function in the cascade:

if a subject subwindow has the detected instance of the certain object, continuing to pass the subject subwindow through the cascade for further processing, and if the subject subwindow does not have the detected instance of the certain object, ceasing to pass the subject subwindow through the cascade.

28. The method of claim 24, wherein the certain objects are human faces.

29. An object detection system for detecting certain objects in an image, comprising:
  (i) an image scanner for dividing an input image into a plurality of subwindows, each subwindow having a sufficient size to allow processing of features associated with the certain objects; and
  (ii) an object detector for processing the subwindows at an average processing rate less than about 200 arithmetic operations for each subwindow by:
    (a) for each subwindow, evaluating the features in the subwindow at one level of accuracy followed by evaluating the same features at increasing levels of accuracy; and
    (b) classifying each subwindow to detect an instance of the certain objects based on the step of evaluating the features, including discarding a subwindow that insufficiently shows features of the certain objects and continuing to evaluate only subwindows having sufficient features that indicate a likelihood of an instance of the certain objects in the subwindows, said image scanner and object detector providing quick detection of instances of the certain objects in a manner enabling real-time application.

30. The object detection system of claim 29, wherein the processing rate is independent of dimensions of the subwindows.

31. The object detection system of claim 29, further comprising an image integrator,
  wherein the image integrator computes an integral image representation of the input image; and
  the object detector uses the integral image representation to compute homogenous classification functions for use in the processing of the subwindows.

32. The object detection system of claim 29, wherein:
  the object detector, for each subwindow, employs a cascade of optimal homogenous classification functions, each optimal homogenous classification function in sequence in the cascade respectively having increasing accuracy in identifying the features associated with the certain objects; and,
  at each optimal homogenous classification function in the cascade, the object detector:
    if a subject subwindow has the detected instance of the certain object, continues to pass the subject subwindow through the cascade for further processing, and
    if the subject subwindow does not have the detected instance of the certain object, ceases to pass the subject subwindow through the cascade.

33. The object detection system of claim 29, wherein the certain objects are human faces.

34. A computer program product comprising:
  a computer usable medium for detecting certain objects in an image; and
  a set of computer program instructions embodied on the computer use able medium, including instructions to:
    (i) divide an input image into a plurality of subwindows, each subwindow having a sufficient size to allow processing of features associated with the certain objects; and
    (ii) process the subwindows at an average processing rate less than about 200 arithmetic operations for each subwindow by:
      (a) for each subwindow, evaluating the features in the subwindow at one level of accuracy followed by evaluating the same features at increasing levels of accuracy; and
      (b) classifying each subwindow to detect an instance of the certain objects based on the step of evaluating the features, including discarding a subwindow that insufficiently shows features of the certain objects and continuing to evaluate only subwindows having sufficient features that indicate a likelihood of an instance of the certain objects in the subwindow
  such that instances of the certain objects are quickly detected enabling real-time application.

35. A method for detecting certain objects in an image, comprising the computer-implemented steps of:
  placing a working window at different positions in an input image such that the input image is divided into a plurality of same dimension subwindows;
  providing a cascade of homogenous classification functions, each of the homogenous classification functions in sequence in the cascade respectively having increasing accuracy in identifying features associated with the certain objects; and
  for each subwindow, employing the cascade of homogenous classification functions to detect instances of the certain objects in the image, wherein each homogenous classification function is based on a number N of the features and a plurality of threshold functions $h_j$, each feature having one of the respective threshold functions $h_j$ identified respectively by an iterator j having values from j=1 to j=N, a given threshold function $h_j$ for a given feature defined as follows:

$$h_j = \begin{cases} 1, & \text{if } p_j f_j(x) > p_j T_j \\ 0, & \text{otherwise} \end{cases}$$

wherein x is a vector of pixel values in a given subwindow; wherein $f_j$ is an evaluation function for the given feature; wherein $T_j$ is a predefined feature threshold for the given feature indicating a presence of the given feature in the subwindow by assigning a value of 1 to the given threshold function $h_j$, and wherein $p_j$ is a polarity value having a value of +1 or −1; and wherein each homogeneous classification function is based on a summation function defined as follows:

$$\sum_{j=1}^{N} w_j h_j(x) > \theta$$

wherein $w_j$ is a predefined weight for each threshold function $h_j$, and wherein θ is a predefined global threshold that determines whether or not the summation function indicates a detection of one of the instances of the certain object in the given subwindow.

36. An object detection system for detecting certain objects in an image, comprising:
- an image scanner for placing a working window at different positions in an input image such that the input image is divided into a plurality of same dimension subwindows; and
- an object detector for providing a cascade of homogenous classification functions, each of the homogenous classification functions in sequence in the cascade respectively having increasing accuracy in identifying features associated with the certain objects;
- the object detector employing, for each subwindow, the cascade of homogenous classification functions to detect instances of the certain objects in the image, wherein each homogenous classification function is based on a number N of the features and a plurality of threshold functions $h_j$, each feature having one of the respective threshold functions $h_j$ identified respectively by an iterator j having values from j=1 to j=N, a given threshold function $h_j$ for a given feature defined as follows:

$$h_j = \begin{cases} 1, & \text{if } p_j f_j(x) > p_j T_j \\ 0, & \text{otherwise} \end{cases}$$

wherein x is a vector of pixel values in a given subwindow; wherein $f_j$ is an evaluation function for the given feature; wherein $T_j$ is a predefined feature threshold for the given feature indicating a presence of the given feature in the subwindow by assigning a value of 1 to the given threshold function $h_j$, and wherein $p_j$ is a polarity value having a value of +1 or −1; and wherein each homogeneous classification function is based on a summation function defined as follows:

$$\sum_{j=1}^{N} w_j h_j(x) > \theta$$

wherein $w_j$ is a predefined weight for each threshold function $h_j$, and wherein $\theta$ is a predefined global threshold that determines whether or not the summation function indicates a detection of one of the instances of the certain object in the given subwindow.

37. A computer program product comprising:
a computer usable medium for detecting certain objects in an image; and
a set of computer program instructions embodied on the computer useable medium, including instructions to:
- place a working window at different positions in an input image such that the input image is divided into a plurality of same dimension subwindows;
- provide a cascade of homogenous classification functions, each of the homogenous classification functions in sequence in the cascade respectively having increasing accuracy in identifying features associated with the certain objects; and
- for each subwindow, employ the cascade of homogenous classification functions to detect instances of the certain objects in the image, wherein each homogenous classification function is based on a number N of the features and a plurality of threshold functions $h_j$, each feature having one of the respective threshold functions $h_j$ identified respectively by an iterator j having values from j=1 to j=N, a given threshold function $h_j$ for a given feature defined as follows:

$$h_j = \begin{cases} 1, & \text{if } p_j f_j(x) > p_j T_j \\ 0, & \text{otherwise} \end{cases}$$

wherein x is a vector of pixel values in a given subwindow; wherein $f_j$ is an evaluation function for the given feature; wherein $T_j$ is a predefined feature threshold for the given feature indicating a presence of the given feature in the subwindow by assigning a value of 1 to the given threshold function $h_j$, and wherein $p_j$ is a polarity value having a value of +1 or −1; and wherein each homogeneous classification function is based on a summation function defined as follows:

$$\sum_{j=1}^{N} w_j h_j(x) > \theta$$

wherein $w_j$ is a predefined weight for each threshold function $h_j$, and wherein $\theta$ is a predefined global threshold that determines whether or not the summation function indicates a detection of one of the instances of the certain object in the given subwindow.

* * * * *

UNITED STATES PATENT AND TRADEMARK OFFICE
CERTIFICATE OF CORRECTION

PATENT NO. : 7,099,510 B2
APPLICATION NO. : 09/992795
DATED : August 29, 2006
INVENTOR(S) : Michael J. Jones et al.

It is certified that error appears in the above-identified patent and that said Letters Patent is hereby corrected as shown below:

In column 8, line 53, delete "subscripts" and insert -- subscript j, --, therefor.

In column 34, line 66, in Claim 13, delete "Window" and insert -- window --, therefor.

In column 35, line 65, in Claim 22, delete "claim 11" and insert -- claim 12 --, therefor.

In column 38, line 2, in Claim 34, delete "use able" and insert -- useable --, therefor.

Signed and Sealed this

Seventeenth Day of March, 2009

JOHN DOLL
*Acting Director of the United States Patent and Trademark Office*